US009710954B2

(12) United States Patent
Peterson et al.

(10) Patent No.: US 9,710,954 B2
(45) Date of Patent: Jul. 18, 2017

(54) PROCESSOR WITH RAY TEST INSTRUCTIONS PERFORMED BY SPECIAL PURPOSE UNITS

(71) Applicant: Imagination Technologies Limited, Kings Langley (GB)

(72) Inventors: Luke T Peterson, San Francisco, CA (US); James A. McCombe, San Francisco, CA (US); Ryan R. Salsbury, San Francisco, CA (US)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 14/503,791

(22) Filed: Oct. 1, 2014

(65) Prior Publication Data

US 2015/0116325 A1   Apr. 30, 2015

Related U.S. Application Data

(63) Continuation of application No. 13/526,435, filed on Jun. 18, 2012, now Pat. No. 8,854,369, which is a continuation of application No. 12/504,437, filed on Jul. 16, 2009, now Pat. No. 8,203,555, which is a continuation of application No. 11/856,612, filed on Sep. 17, 2007, now Pat. No. 7,969,434.

(60) Provisional application No. 60/826,201, filed on Sep. 19, 2006.

(51) Int. Cl.
  *G06T 15/06*   (2011.01)
  *G06T 15/40*   (2011.01)
  *G06F 15/76*   (2006.01)
  *G06T 15/00*   (2011.01)

(52) U.S. Cl.
  CPC ............ *G06T 15/06* (2013.01); *G06T 15/005* (2013.01)

(58) Field of Classification Search
  None
  See application file for complete search history.

(56) References Cited

U.S. PATENT DOCUMENTS

| 5,933,146 A | 8/1999 | Wrigley |
| 6,023,279 A * | 2/2000 | Sowizral ................ G06T 15/06 345/421 |
| 6,191,789 B1 | 2/2001 | Yamato et al. |

(Continued)

*Primary Examiner* — Said Broome
(74) *Attorney, Agent, or Firm* — Vorys, Sater, Seymour and Pease LLP; Vincent M DeLuca

(57) ABSTRACT

A processor supports special-purpose instructions relating to testing rays for intersection with geometry and acceleration structure elements. The processor can be a full-featured processor; the special-purpose instructions can be differentiated from other supported instructions. The processor can have an instruction generator coupled with an instruction decoder, a data cache, a fetch unit, and a set of test cells for performing computations indicated by special-purpose instructions. Separate test cells can test rays with scene geometry and with acceleration structure elements; different instructions can be provided for each type of testing. The data cache is coupled to the test cells; the instruction decoder also provides input to the test cells while the test cells are coupled to a write back unit that is coupled to the data cache and to the instruction generator. In an example, the instruction decoder supplies ray references from an instruction as functional addresses to the data cache.

19 Claims, 8 Drawing Sheets

(56) References Cited

U.S. PATENT DOCUMENTS

| | | |
|---|---|---|
| 6,556,200 B1 | 4/2003 | Pfister et al. |
| 6,597,359 B1 | 7/2003 | Lathrop |
| 7,012,604 B1 * | 3/2006 | Christie .................. G06T 15/06 345/426 |
| 7,034,825 B2 | 4/2006 | Stowe et al. |

* cited by examiner

PROCESSOR WITH RAY TEST INSTRUCTIONS PERFORMED BY SPECIAL PURPOSE UNITS

CROSS REFERENCE TO RELATED APPLICATIONS

This application is a continuation of U.S. patent application Ser. No. 13/526,435, filed on Jun. 18, 2012, now U.S. Pat. No. 8,854,369, issued on Oct. 7, 2014, which is a continuation of U.S. patent application Ser. No. 12/504,437, filed on Jul. 16, 2009, now U.S. Pat. No. 8,203,555, which is a continuation of U.S. patent application Ser. No. 11/856,612, filed Sep. 17, 2007, now U.S. Pat. No. 7,969,434, which claims priority from U.S. provisional application No. 60/826,201, entitled "Ray Tracing Enhancements for Graphical Rendering", and filed on Sep. 19, 2006, all of which are incorporated by reference in their entireties, for all purposes, herein.

BACKGROUND

Field

The present invention generally relates to rendering two-dimension representations from three-dimensional scenes, and more particularly to using ray tracing for accelerated rendering of photo-realistic two-dimensional representations of scenes.

Description of Related Art

Rendering photo-realistic images with ray tracing is well-known in the computer graphics arts. Ray tracing is known to produce photo-realistic images, including realistic shadow and lighting effects, because ray tracing models the physical behavior of light interacting with elements of a scene. However, ray tracing is also known to be computationally intensive, and at present, even a state of the art graphics workstation requires a substantial amount of time to render a complicated scene using ray tracing.

Ray tracing usually involves obtaining a scene description composed of geometric primitives, such as triangles, that describe surfaces of structures in the scene, and modeling how light interacts with primitives in the scene by tracing light rays in the scene. A ray is a vector of virtual light with an origin and a direction in 3-space.

For example, a scene may comprise a car on a street with buildings on either side of the street. The car in such a scene may be defined by a large number of triangles (e.g., 1 million triangles) that approximate a continuous surface. A camera position from which the scene is viewed is defined. A ray cast from the camera is often termed a primary ray, while a ray cast from one object to another, for example, to enable reflection is often called a secondary ray. An image plane of a selected resolution (e.g., 1024×768 for an SVGA display) is disposed at a selected position between the camera and the scene.

A principal objective of ray tracing is to determine a color and intensity for each pixel of the image plane, such that this image can thereafter be displayed on a monitor, for example. In the physical world, viewing such a scene from the cameras perspective would result in light rays reaching the camera that owe their existence to one or more light sources, including diffuse and directed light sources. In the physical world, these light sources project light energy into the scene, and this light energy is transmitted, diffracted, reflected, and/or absorbed according to the types of materials that the light contacts, and the order in which they are contacted, during its journey from light source to the camera. This process is what ray tracing attempts to duplicate.

Although the physical world operates by light energy being traced from a source to the camera, because only a small portion of the light generated by a source arrives at the camera, it has been recognized that rays, for most circumstances, should be traced from the camera back to determine intersections with light sources, instead.

A simplistic ray tracing algorithm involves casting one or more rays from the camera through each pixel of the image into the scene. Each ray is then tested against each primitive composing the scene to identify a primitive which that ray intersects, then it is determined what effect that primitive has on the ray, for example reflecting and/or refracting it. Such reflection and/or refraction causes the ray to proceed in a different direction, and/or split into multiple secondary rays, which can take different paths. All of these secondary rays are then tested against the scene primitives to determine primitives they intersect, and the process recursively continues until the secondary (and tertiary, etc.) ray terminates by, for example, leaving the scene, or hitting a light source. While all of these ray/primitive intersections are being determined, a tree mapping them is created. After a ray terminates, the contribution of the light source is traced back through the tree to determine its effect on the pixel of the scene. As can be readily understood, the computational complexity of testing 1024×768 (for example) rays for intersection with millions of triangles is computationally expensive—and such ray numbers do not even account for all of the additional rays spawned as a result of material interaction with intersecting rays).

Also, it has been understood that tracing rays through a scene can require practically random access to an enormous amount of scene geometry. As can be appreciated, the typical computational paradigm provides for various memory tiers with an inverse relationship between latency and bandwidth and memory size. For example, most computing systems provide several tiers of caches that intermediate memory accesses to a main dynamic memory, which in turn intermediates access to non-volatile storage. Accessing the main dynamic memory can be an order of magnitude slower in bandwidth and latency than accessing an on-chip cache, and accessing non-volatile memory can be even slower in latency and bandwidth than accessing a main memory. For some applications, existing processor architectures can successfully hide a great deal of the latency differences by predicting when data presently in main memory or in non-volatile memory will be required. Such prediction has been found to be difficult in ray tracing, such that when using a tiered cache computer for ray tracing, the caches can thrash a great deal. On the other hand, providing enough fast memory to allow random access to all the primitives composing an entire complex scene is quite expensive and beyond the capabilities of most conventional systems. In the future, it is expected that scene resolution and complexity will continue to increase, and thus even though computers will become more powerful, with more memory, and higher memory bandwidths, the problem described above is expected to continue.

Some algorithmic approaches directed at this sort of problem have been proposed. One such approach is disclosed by Matt Pharr, et al. in "Rendering Complex Scenes with Memory-Coherent Ray Tracing" *Proceedings of SigGraph* (1997) ("Pharr" herein). Pharr discloses dividing a scene to be ray traced into geometry voxels, where each geometry voxel is a cube that encloses scene primitives (e.g., triangles). Pharr also discloses superimposing a scheduling grid, where each element of the scheduling grid is a scheduling voxel that can overlap some portion of the geometry voxels (i.e., the scheduling voxel is also a volumetric cube in the scene that can be sized differently than the cubes of the geometry voxels). Each scheduling voxel has an associated ray queue, which includes rays that are currently inside, i.e., these rays are enclosed within, that scheduling voxel, and information about what geometry voxels overlap that scheduling voxel.

Pharr discloses that when a scheduling voxel is processed, the rays in the associated queue are tested for intersection with the primitives in the geometry voxels that are enclosed by the scheduling voxel. If intersection between a ray and a primitive is found, then shading calculations are performed, which can result in spawned rays that are added to the ray queue. If there is no found intersection in that scheduling voxel, the ray is advanced to the next non-empty scheduling voxel and placed in that scheduling voxel's ray queue.

Pharr discloses that an advantage sought by this approach is to help scene geometry to fit within a cache that might normally be provided with a general purpose processor, such that if the scene geometry within each scheduling voxel can fit within a cache would not thrash much during intersection testing of rays with that scene geometry.

Also, Pharr discloses that by queuing the rays for testing in the scheduling voxel, that when the primitives are fetched into the geometry cache, more work can be performed on them. In situations where multiple scheduling voxels could be processed next, the scheduling algorithm can choose a scheduling voxel which would minimize the amount of geometry that needs to be loaded into the geometry cache.

Pharr recognizes that the proposed regular scheduling grid may not perform well if a particular scene has non-uniform complexity, i.e., a higher density of primitives in some portions of the scene. Pharr hypothesizes that an adaptive data structure, such as an octree could be used in place of the regular scheduling grid. An octree introduces a spatial subdivision in the three-dimensional scene by causing, at each level of the hierarchy, a subdivision along each principal axis (i.e., the x, y, and z axis) of the scene, such that an octree subdivision results in 8 smaller sub-volumes, which can each be divided into 8 smaller sub-volumes, etc. At each sub-volume, a divide/do not divide flag is set which determines whether that sub-volume will be further divided or not. Such sub-volumes are indicated for sub-division until a number of primitives in that sub-volume is low enough for testing. Thus, for an octree, an amount of subdivision can be controlled according to how many primitives are in a particular portion of the scene. As such, the octree allows varying degrees of volumetric subdivision of a volume to be rendered.

A similar approach is disclosed in U.S. Pat. No. 6,556,200 to Pfister ("Pfister"). Pfister also discloses partitioning a scene into a plurality of scheduling blocks. A ray queue is provided for each block, and the rays in each queue are ordered spatially and temporally using a dependency graph. The rays are traced through each of the scheduling blocks according to the order defined in the dependency graph. Pfister references the Pharr paper and adds that Pfister desires to render more than one single type of graphical primitive (e.g., not just a triangle), and to devise more complicated scheduling algorithms for the scheduling blocks. Pfister also contemplates staging sub-portions of scene geometry at multiple caching levels in memory hierarchy.

Yet another approach has been referred to as packet tracing, and a common reference for such packet tracing is "Interactive Rendering through Coherent Ray Tracing" by Ingo Wald, Phillip Slusallek, Carsten Benthin, et al., *Proceedings of EUROGRAPHICS* 2001, pp 153-164, 20(3), Manchester, United Kingdom (September 2001). Packet tracing involves tracing a group of coherent rays through a grid. The rays emit from a substantially common grid location and travel in a substantially similar direction, such that most of the rays go through common grid locations. Thus, packet tracing requires identifying rays traveling in a similar direction, from a similar origin. Another variation is to use frustrum rays to bound edges of the packet of rays, such that the frustrum rays are used to determine which voxels are intersected, which helps reduce a number of computations for a given ray packet (i.e., not all rays are tested for intersection, but only those on the outer edges of the packet). Packet tracing still requires identification of rays that originate from a similar place and go in a similar direction. Such rays can be increasingly difficult to identify as rays are reflected, refracted and/or generated during ray tracing.

SUMMARY

The following system, method, and computer readable medium aspects are for accelerating intersection testing of rays traveling in a three-dimensional scene with primitives composing the scene. The rays may be provided from a driver and/or some other mechanism. Indicia of intersections between rays and primitives may be provided to a rendering system for further processing in order to ultimately display a rendered image of the scene. Examples of particular aspects include the following.

A first example aspect includes a method for determining intersections between geometric primitives composing a scene and rays traveling in the scene, and which may be used in a ray tracing system. The method comprises receiving an abstraction of a three-dimensional scene composed of geometric primitives, the abstraction includes nodes of geometric acceleration data bounding selections of the primitives. The selections of primitives have varying relative granularity, and are arranged as nodes in a graph with edges connecting pairs of nodes. The method also comprises traversing the graph with collections of rays, the rays of each collection identified at least by testing rays traveling in the scene for possible intersection with node(s) of the graph selected for test. For any ray detected to possibly intersect one of the node(s) selected for test, adding that ray to a respective collection corresponding to that possibly intersected node, for further intersection testing with node(s) connected to the tested node(s). That further intersection testing is differed until that collection is determined ready, and the method then further comprises selecting, for test, node(s) connected to that possibly intersected node. During the traversing of the graph, the method also comprises testing for intersection any primitive bounded by a test node that is not also bounded by another node of higher relative granularity than the test node, the testing for rays in a collection associated with the test node. The method also comprises outputting indications of detected possible intersections.

The method aspect above may be performed with graphs wherein a node with relative granularity higher than another node bounds a primitive selection smaller than the another node, or a node of relative granularity higher than another node bounds a smaller three-dimensional volume than the another node. The graph may be a directed graph such that each edge of the directed graph.

Further aspects include an intersection testing system for use in ray-tracing based rendering of a two dimensional representation of a three-dimensional scene composed of geometric primitives. The intersection testing system comprises a source of primitives and geometry acceleration data (GAD). The GAD comprises nodes bounding selections of the primitives, and the nodes are arranged in a graph with edges between pairs of nodes. The selection of primitives bounded by a first node of a node pair has a varying relative granularity compared to the other node of the pair.

The system also comprises a source of data representative of rays traveling in the scene, and an intersection testing unit (ITU) interfaced to the source of primitives and GAD and to the source of ray data. The ITU is configured to obtain ray data, to test those rays for intersection with nodes of the GAD, and to accumulate references to rays that possibly intersect nodes in a respective ray collection associated with each node. Each such ray collection is stored in a buffer from which the ITU is configured to both read and write, and wherein the ITU is operable to defer further processing on each collected ray. The system also comprises an intersection test controller configured to identify ray collections for further intersection testing and to arrange such a ray collection for intersection testing with nodes of the GAD that bound, with increased granularity, primitives bounded by the nodes corresponding to the identified ray collections.

The system of such an exemplary aspect can also include a first memory resource of sufficient size to store the primitives and the GAD for the scene being rendered. Such a system can also provide that the source of data representative of rays traveling in the scene includes a second memory resource of sufficient size to store at least 10000 rays in flight, and the system can provide for interface of the first memory resource and the second memory resource to the ITU without an intermediating cache.

Such a system can operate to accumulate references to rays that possibly intersect with nodes of GAD regardless of coherency of origin and/or direction of the rays. Any of these systems and methods can also be provided in a computer readable medium.

Still further aspects include an intersection testing unit (ITU) for use in a ray-tracing based rendering system, where the ITU is for identifying intersections of rays traveling in a 3-D scene and primitives composing the scene. The ITU comprises a plurality of test cells, where each of the test cells is coupled to a source of geometry acceleration data (GAD) elements and is configured to test a ray provided to it for intersection with a GAD element, and to output an indication of an identified possible intersection. The ITU further comprises a controller couple to a first memory resource having a capacity, and a first ray input, where each of the first memory resource and the first ray input are configured to provide, in response to the controller, and to each of the plurality of test cells, data descriptive of a ray.

The controller is configured to maintain a plurality of collections of references to rays, where each ray of each respective collection relates to the other rays of its collection by intersection with a common GAD element. The controller also is configured to cause the memory to provide different rays of a selected collection as the respective rays provided to each of the test cells, and to determine which collections are ready for test, select a collection ready for test, and cause provision of rays of that collection to the test cells. If no collection is ready for test and the first memory resource can store more rays, then the controller is configured to receive rays from the first ray input. The controller also is configured to select a collection for test and cause the memory to provide rays of that collection to the test cells, if the first memory resource has insufficient capacity for more rays. The selection is based at least in part on a heuristic.

Other example aspects can include an intersection test method or a computer readable medium for performing the method, where the method comprises receiving rays for which to identify a primitive of a scene description that each ray intersects, if any, wherein the primitives are bounded in three-dimensional space by geometry acceleration data (GAD). The GAD comprises nodes bounding selections of the primitives, and the nodes are arranged in a graph with respective edges between pairs of nodes. The method also comprises testing the received rays for intersection with nodes of the GAD, and outputting an indication of each ray/node intersection detected, such indications are collected, into collections for each node, such that the rays collected for each node include both rays coherent and incoherent with other rays of the collection. Examples of such methodology may operate to allow and/or encourage production of many non-camera rays, and testing various collections comprising both non-camera and camera rays for intersection in parallel. Rays that can be collected for parallel testing can be camera rays, and non-camera rays that are unrelated in terms of ancestry (i.e., spawned from different camera rays, and of different generations), and also not coherent in terms of origin and direction, such that rays need not be tested in an order that they would travel through the scene.

The method also comprising deferring processing of ray collections while continuing to receive rays until a determination that a collection is ready for further processing, and then the method comprises then testing the rays of that collection against the GAD of nodes connected to the node to which that collection corresponds.

Still further method and computer readable medium aspects include receiving a plurality of rays to test for intersection with primitives composing a three-dimensional scene, where at least some of the rays having one or more of a disparate origin and a disparate direction compared to other rays of the plurality. The method also comprises receiving a hierarchical graph of geometry acceleration data (GAD), the graph of GAD comprising elements of GAD arranged as nodes of the graph, with leaf nodes directly bounding respective selections of primitives and other nodes bounding other elements of GAD, and selecting nodes of the graph as test nodes. The method also comprises testing rays for intersection with the test nodes, and collecting rays that intersect each node into an associated collection. Rays tested may be coincidentally collected into multiple of the collections, until determining that one or more of the collections are ready for further processing. The method also comprises identifying, as a leaf test node, any leaf node associated with a ready collection, obtaining primitives bounded by such leaf test nodes, testing rays of collections associated with such leaf test nodes for intersection with primitives bounded by such leaf test nodes, tracking detected possible intersections, and upon identifying a closest possible intersection for any ray, outputting an indication of such intersection. For any other collections determined ready for further processing, the method also comprises identifying nodes of the graph connected to nodes associated with the ready collections, selecting those connected nodes as test nodes, and continuing with the testing.

Any of the above methods and systems can operate such that rays can be added to multiple ray collections, such that rays can be tested for intersection with spatially distinct regions of the scene description substantially in parallel.

BRIEF DESCRIPTION OF THE DRAWINGS

For a fuller understanding of aspects and examples disclosed herein, reference is made to the accompanying drawings in the following description.

DETAILED DESCRIPTION

Figure 1:
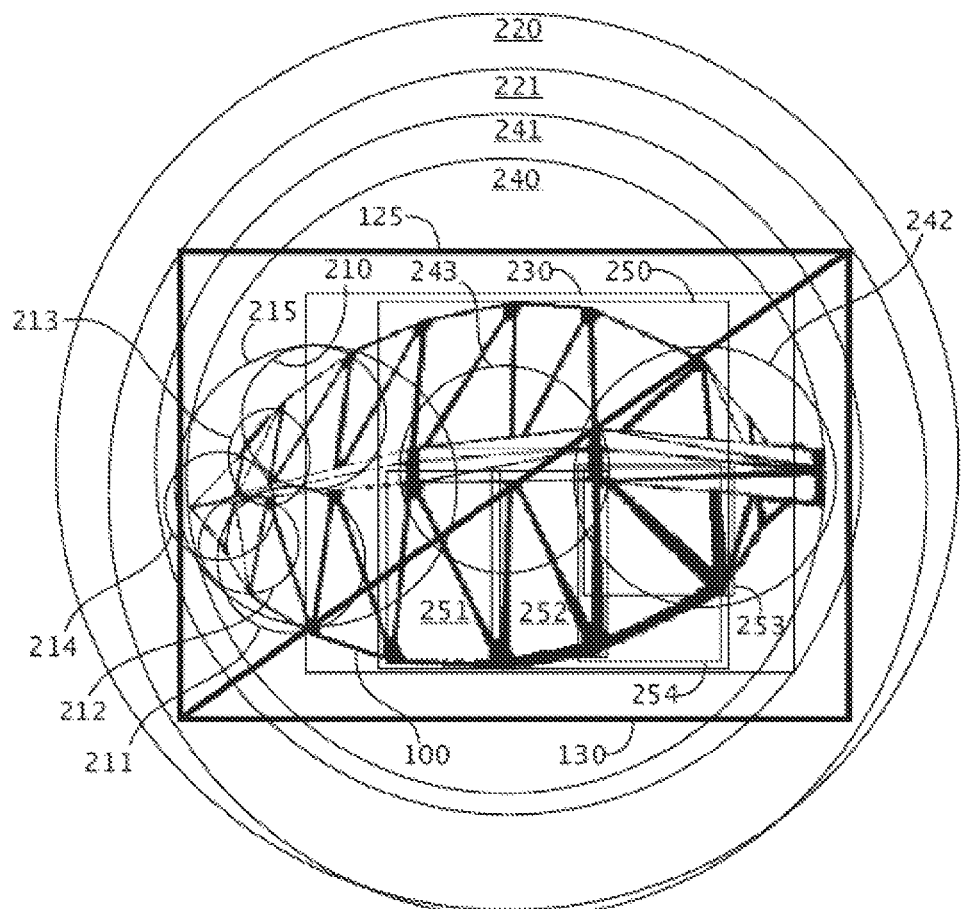
FIG. 1 illustrates a simplistic example of a scene to render.

The following description is presented to enable a person of ordinary skill in the art to make and use various aspects of the inventions. Descriptions of specific techniques, implementations and applications are provided only as examples. Various modifications to the examples described herein may be apparent to those skilled in the art, and the general principles defined herein may be applied to other examples and applications without departing from the scope of the invention. This description first proceeds by introducing aspects relating to an example of a three-dimensional (3-D) scene (FIG. 1), that can be abstracted with geometry acceleration data, as in the example of FIG. 2. Such a 3-D scene can be rendered as a two-dimensional representation with systems and methods according to the examples illustrated and described.

As introduced in the background, a 3-D scene needs to be converted into a 2-D representation for display. Such conversion requires selecting a camera position, from which the scene is viewed. The camera position frequently represents a location of a viewer of the scene (e.g., a gamer, a person watching an animated film, etc.) The 2-D representation is usually at a plane location between the camera and the scene, such that the 2-D representation comprises an array of pixels at a desired resolution. A color vector for each pixel is determined through rendering. During ray tracing, rays can be initially cast from the camera position to intersect the plane of the 2-D representation at a desired point, and then continue into the 3-D scene. A location at which a ray intersects the 2-D representation is retained in a data structure associated with that ray.

A camera position is not necessarily a single point defined in space, and instead a camera position can be diffuse, such that rays can be cast from a number of points considered within the camera position. Each ray intersects the 2-D representation within a pixel, which can also be called a sample. In some implementations, a more precise location of where a ray intersected a pixel can be recorded, which may allow more precise interpolation and blending of colors among neighboring pixels.

Representing realistic and finely detailed objects in the 3-D scene is usually done by providing a large number of small geometric primitives that approximate a surface of the object (i.e., a wire frame model). As such, a more intricate object may need to be represented with more primitives and smaller primitives than a simpler object. Although providing a benefit of higher resolution, performing intersection tests between rays and larger numbers of primitives (as described above, and as will be described further below) is computationally intensive, especially since a complex scene may have many objects. Therefore, geometry acceleration data (hereinafter referred to as GAD) can be used to approximate boundaries for one or more primitives (or abstracting) in a scene to accelerate such testing. Examples of GAD are described further below.

For clarity in description, data for a certain type of object, e.g., a primitive (e.g., coordinates for three vertices of a triangle) is described simply as the object itself, rather than referring to the data for the object. For example, when referring to "fetching a primitive", it is to be understood that data representative of that primitive is being fetched, rather than a physical realization of that primitive.

GAD may include elements that each bound a collection of the primitives in the scene. Bounding may include providing a geometric shape that encloses, in 3-D space, a respective collection of primitives, such that failure to intersect a surface of the geometric shape with a ray indicates that the ray also does not intersect any primitive bounded by the shape.

Since GAD primarily is useful in abstracting primitives for more quickly identifying intersections between rays and primitives, GAD elements preferably are shapes that can be easily tested for intersection with a ray. For example, testing a sphere for intersection with a ray usually requires less computation than testing a 3-D box in a KD tree. Other considerations for GAD shapes can include the shape of a primitive whose boundary is being approximated, and whether a GAD shape should be rotated to better fit a primitive or a collection of primitives, or whether the shape should be irrotational within a scene. Examples of constructs that can be used as GAD include spheres, squares, rectangles, groups of splines, and so on.

GAD may include a number of distinct elements that can be interrelated to each other. For example, elements of GAD can be a plurality of spheres, where each sphere bounds a portion of geometry describing an aspect or portion of a scene to be rendered. Spheres of the plurality can be interrelated with each other in a graph.

In a graph of elements of GAD, the elements may be identified as graph nodes, and pairs of the elements may be connected by edges. Where a pair of elements is connected by an edge, the edge may indicate that one of the nodes has a different relative granularity than the other node, which can mean that one of the nodes connected by that edge bounds more or fewer primitives than the other node. Thus, in such an arrangement of GAD, by traversing the graph along its edges during intersection testing, rays being tested for intersection can be tested against GAD elements bounding varying amounts and/or arrangements of primitives.

As introduced above, a sphere is one type of shape that can be used as a GAD element. Using spheres as GAD elements may enhance portability/interchangeability of portions of a GAD graph. A graph of spherical GAD need not conform to an explicit goal of remaining balanced, spatially, or otherwise, as often is the case in a KD tree. For example, entire portions of such a graph can be moved at will. Such portability may allow for the optimization of a GAD graph that will remain in a rendering system for more than one frame. It will also allow an artist to provide hints to the system as to which primitives and other pieces of geometry comprise building blocks for the larger scene, or may be intersected by a disproportionately large portion of the rays in the scene.

In some aspects, the elements of the GAD can be arranged hierarchically in the graph such that the graph of GAD includes one or more root nodes that collectively bound the primitives describing the scene, and where each root node bounds a subset of those primitives. The root node(s) of a graph of GAD also may be implied simply because a scene generally has only a given extent (i.e., the scene is finite), and the root node may be defined to include the entire scene. For example, a scene may be defined within a bounding box or sphere, and the root node may impliedly be functionally co-extensive to that bounding box.

Each root node may have one or more child nodes that each bound a subset of the primitives bounded by a respective root node. In turn, these child nodes can serve as parent elements for one or more child elements that bound subsets of primitives bounded by its respective parent node. The subsets of primitives bounded by child nodes of a particular parent node may be disjoint, such that primitives bounded by one of the child nodes are not also bounded by another of the child nodes. Various child nodes may have non-zero unions between their respective sets of bounded primitives, while also not having a subset relationship either.

Further subdivision of the primitives bounded by a particular element of GAD may be made until the number of primitives bounded within such GAD element is deemed small enough to not require further subdivision. Such subdivision of primitives among elements of GAD can serve to provide a framework for referencing groups of primitives with a desired degree of granularity. For example, the leaf illustrated in FIG. 1 can be abstracted first with a sphere (i.e., an element of GAD) that bounds the entire leaf, and then smaller portions of the leaf can be abstracted with smaller spheres or other shapes. For example, the vein may be abstracted with a one or more spheres. A sphere bounding (abstracting) the entire leaf need not also bound the entirely of a sphere bounding only a part of the leaf, and frequently may not do so. In other words, a primitive in a scene may be bounded by multiple GAD elements, but each GAD element bounding that primitive need not also be bounded by other GAD elements that also bound that primitive.

Sufficiency of subdivision can be based on characteristics of a hardware unit or other resources intended to perform the intersection testing. For example, if an intersection testing unit (examples of such provided below) included 32 testing units, then subdivision may continue until no more than 32 primitives were bounded by a particular element of GAD to allow testing of all the primitives of one element of GAD to be done in parallel, as described in more detail below.

Although the above example primarily focuses on an example of spherical bounding elements arranged in a graph, other types of geometry acceleration structures including KD trees, octrees, BSP trees, and voxel grids can be arranged as graphs of nodes. For example, nodes of the graph, if based on a kd tree, would include nodes of the kd-tree. Edges of the graph would include the conceptual further subdivision of a given space, in other words, a given node would have up to 8 edges connecting the given node to up to 8 other nodes, each being a cube found within a boundary of the given node. Similar situations apply to the other example geometry acceleration structures cited.

In summary of some exemplary aspects of GAD herein, GAD may comprise a graph of nodes, where nodes may be connected by respective edges to other nodes. In some aspects, each node is connected to only one other node. In some aspects, an edge connecting a first node to a second node indicates a direction of granularity between the first and second node. For example, higher granularity can indicate which of the first or the second node connected by an edge bounds fewer GAD elements or individual pieces of geometry, or a combination thereof. In a converse example, lower granularity can indicate that one of the nodes bounds all of the primitives also bounded by the higher granularity node, in addition to primitives bounded by a different node, which can be connected to the lower granularity node by another edge.

This direction of granularity may be defined explicitly or implicitly in the graph, meaning that where explicitly defined, an intentionally directed search may be conducted, generally in a direction from larger GAD elements towards smaller elements such that increasingly smaller amounts of primitives to test for intersection can be identified. Where a direction is implicit, a directed search may happen coincidentally, or information defining a bounding volume can be used to extract a direction in the graph. For example, a test could be conducted to determine relative sizes of the GAD elements, and a smaller of the elements could be selected.

Broadly viewed, elements of GAD may heterogeneously bound both other elements of GAD as well as primitives that are not also bounded by another GAD element bounded at least in part by any smaller GAD element. For example, a larger sphere may bound the entire leaf illustrated in FIG. 1, while respective smaller spheres each may bound the primitives that define a tip of the leaf, but a portion of the leaf may be defined by primitives that are not bounded by any sphere smaller than the sphere which bounds the entire leaf. A GAD arrangement may be defined such that any one element of GAD bounds only primitives or other GAD elements, such that primitives would not be tested for intersection until leaf nodes of such an arrangement are reached.

In further summary of some particular examples, hierarchically arranged GAD can be used to represent the geometry of the three-dimensional scene. Root node(s) of the hierarchically arranged GAD can represent the entire three-dimensional scene. Intermediate nodes of the hierarchically arranged geometry acceleration data can represent differently sized, or differently grouped, sub-portions of geometry of the three-dimensional scene. Leaf nodes of the hierarchically arranged geometry acceleration data can bound geometric primitives of the three-dimensional scene. Also any graph of GAD can include, as nodes of the graph, complete sub-graphs of nodes that can be traversed. And in the particular example of hierarchical graphs, each node can include a hierarchical sub-graph.

When generating an intra-primitive hierarchy, a simple state machine can yield sufficient results (approaching those as good as a highly optimized hierarchy). This is because most objects bear some resemblance to spheres, and that often, objects in a scene are often large, relative to the space between objects. The generation of geometry data and geometry acceleration data can occur asynchronously, such that a software driver can receive geometry data and produce from it geometry acceleration data.

Figure 2:
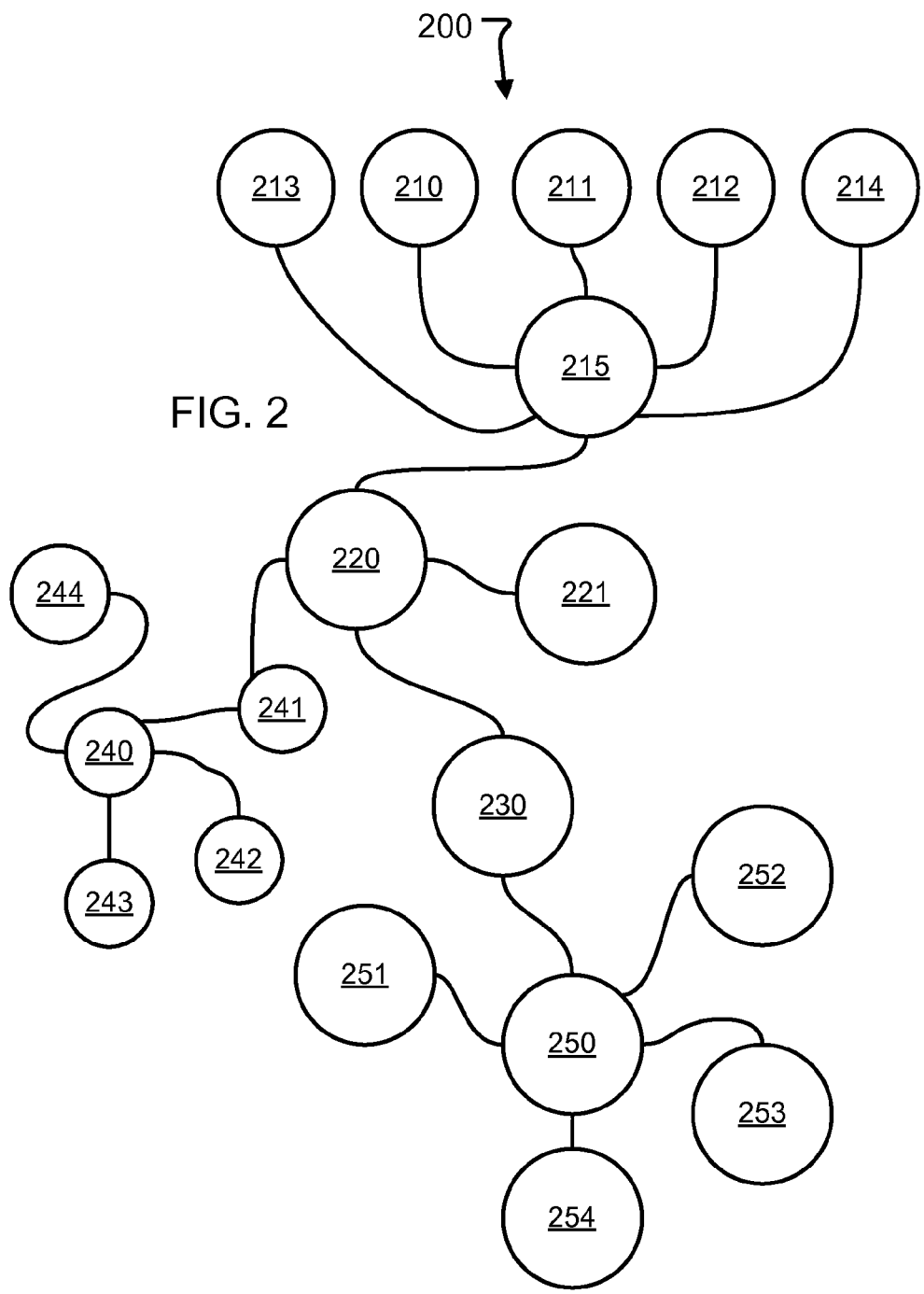
FIG. 2 introduces a simplified example of a graph of geometry acceleration data used to abstract the scene of FIG. 1.

To provide a more concrete example, FIG. 1 illustrates a top view of leaf 100 with nodes of geometry acceleration data bounding selections of primitives composing the leaf, the nodes of GAD are displayed in an example graph 200 arrangement in FIG. 2. Leaf 100 is illustrated as being on a background composed of two large triangles, triangle 130 and triangle 125. Each circle and box represents a 3-D sphere and box respectively. The boxes can be rectangular or cubic, or even some other shape, like a parallelepiped, if it were so desired in an implementation.

As depicted, the elements of GAD can include shapes other than spheres, e.g., rectangles 251, 252, 253, and 254. Other aspects to note about such bounding is that sphere 220 functions as a root node, bounding the entire leaf. Sphere 221 bounds the large triangles 130 and 125 composing a background for leaf 100, as well as leaf 100. Sphere 220 bounds both sphere 221 and sphere 241, which in turn bounds sphere 240. Both sphere 240 and sphere 241 bound primitives composing leaf 100. The arrangement of sphere 220, 221, 240 and 241 illustrates that one sphere need not bound multiple "child" spheres. Also, the arrangement of 220 and 221 (see FIG. 2) that even though two spheres bound the same geometry, they need not also have connectivity to nodes bounding subsets of primitives in the scene.

Sphere 215 bounds the tip quarter of leaf 100. Sphere 215 is not entirely bounded by sphere 240, even though sphere 240 bounds the primitives bounded by sphere 215. Referencing sphere 215 in FIG. 2, it is illustrated that nodes 210-214 are children of sphere 215, but the full extent of each sphere 210-214 need not be bounded by sphere 215, as the consideration of interest is that the primitives are bounded. Spheres 242 and 243 bound portions of a center vein of leaf 100. Box 230 bounds a selection of the primitives of leaf 100, and also includes children nodes 250-254 as illustrated in the graph 200. Box 250 bounds both primitives directly and child notes. Boxes 251 and 252 bound primitives directly, while boxes 253 and 254 each bound one primitive. The use of both boxes and spheres indicates that different shapes for GAD can be used simultaneously. Also, GAD elements may bound one or more than one primitive.

FIG. 2 illustrates a graph 200 of elements of GAD that can be used to abstract a small portion of the scene of FIG. 1. In particular, because of the extremely small nature of scene primitives to the size of the scene of FIG. 2 as a whole, To simplify, graph 200 includes only a few nodes that each represents an element of GAD that bounds a portion of primitives composing the scene. As can be understood, this example is of a largely hierarchical arrangement of elements of GAD in a graph. By illustration if a ray is tested for intersection with the element of GAD at node 230, and it does not intersect node 230, testing need not be done for GAD elements 240-244, or for primitives within those elements. Where a primitive is bounded by multiple GAD elements, incidentally or otherwise, there is at least a partial overlap in space between these elements, and a primitive within that overlap may have intersection testing skipped, and then have it performed later during processing of another GAD element.

Figure 3:
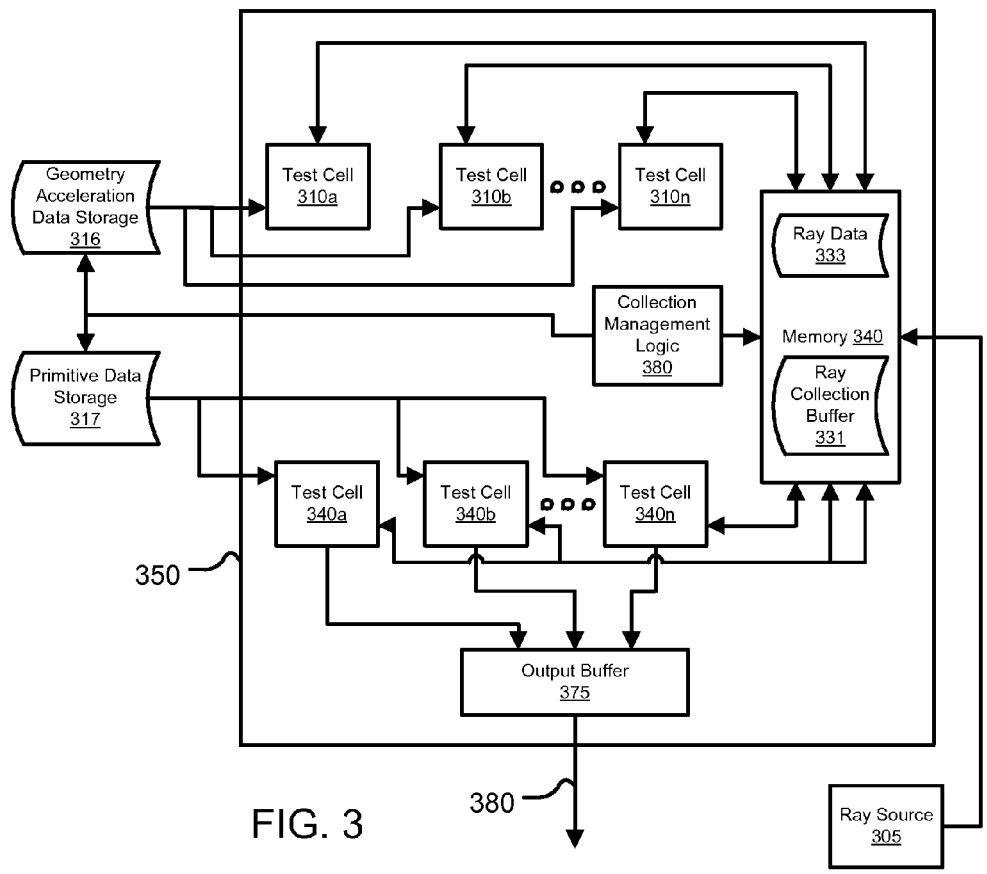
FIG. 3 illustrates aspects of an intersection testing unit that may provide intersection testing functionality to a rendering system.

FIG. 3 includes a block diagram of an example intersection testing unit (hereinafter, "ITU") 350 that can be used in a rendering system for ray tracing two dimensional representations of a three dimensional scene. The ITU 350 can be viewed as a function or a utility that can be called through a control process or driver that provides ITU 350 with rays and elements of a scene against which the rays would be tested for intersection. The ITU 350 can be implemented in hardware and/or software (e.g., multiple pieces of software, such as software subroutines) as appropriate, and where it is implemented at least partially in software, computer-executable instructions representing ITU 350 unit functionality can be stored on computer-readable media. For accelerating the ray tracing, the ITU 350 is also provided with GAD that bounds portions of the scene, and which the ITU can use for accelerating intersection testing of the rays. The GAD would be provided in a format useful by the ITU 350, and may be the subject of a handshake procedure, or parameter selection, pre-arranged organization, and the like.

ITU 350 returns indications of identified intersections, which typically includes that the ITU 350 provides information sufficient to identify a ray and a primitive which the ray was determined, within a given degree of precision, to intersect.

For example, ITU 350 can be fed information through a driver that interfaces ITU 350 with other rendering processes, such as shading, and initial ray generation functions. From the perspective of ITU 350, ITU 350 need not be "aware" of the origin of the information provided to it, as ITU 350 can perform intersection testing using the rays, GAD, and primitives (or more generally, scene geometry) provided to it, or obtained by it based on other information provided to it.

ITU 350 may control how, when, and what data is provided to it, such that ITU 350 is not passive, and may for example, fetch ray or geometry data, or acceleration data as required for intersection testing. For example, ITU 350 may be provided with a large number of rays for intersection testing, along with information sufficient to identify a scene in which the rays are to be tested. ITU 350 may thereafter control temporary storage of the rays during processing and may also initiate fetching of primitives and elements of GAD as needed during the processing. In some examples, ITU 350 may be provided more than ten thousand rays (10,000) rays for intersection testing at given time. In other words, ITU 350 may be provided with more than 10,000 rays at an initial startup, and as testing for rays complete, new rays may be provided to keep the number of rays being processed in the ITU 350 at about the initial number.

Also, ITU 350 can operate asynchronously with respect to units that provide input data to it, or receive outputs from it. Here, "asynchronous" can include that the ITU may receive and begin intersection testing of additional rays while intersection testing continues for previously received rays. Also, "asynchronous" may include that rays do not need to complete intersection testing in an order that ITU 350 received them. Asynchronous also includes that intersection testing resources in ITU 350 are available for assignment or scheduling of intersection testing without regard to position of a ray within a 3-D scene, or a scheduling grid superimposed on the scene, or to test only rays having an intergenerational relationship, such as parent rays and children rays spawned from a small number of parent rays, or only rays of a specific generation—e.g., camera rays or secondary rays.

Regarding the particulars of this example ITU 350, ITU 350 includes a memory 340, which receives rays from a source of rays 305, which can be a driver running on a host processor, or shading code or a shading processor, or a combination thereof, for example. Memory 340 includes logical and/or physical partitions for storing ray data, identified as ray data 333, and a ray collection buffer 331, both of which are further described herein, along with their usage and functionality.

ITU 350 includes a plurality of test cells 310*a*-310*n* and test cells 340*a*-340*n*. Test cells 310*a*-310*n*, in the present example, are for testing elements of GAD provided from a GAD data storage 316, while test cells 340*a*-340*n* are for testing primitives provided from a primitive data storage 317. Logically, GAD data storage 316 and primitive data storage 317 are separately identified, but they may be the same physical memory resource, or may be partially shared and partially distinct.

ITU 350 also includes an output buffer 375 which receives indications of identified intersections of primitives and rays which intersected the primitive. In an example, the indications include an identification for a primitive paired with an information sufficient to identify a ray that intersected the primitive. Identification information for a ray may include a reference, such as an index, which identifies a particular ray in a list of rays maintained in resources available to a host processor. For example, the list may be maintained by a driver running on a host processor. The ray identification information may also include information, such as the ray's origin and direction, sufficient to reconstruct the ray. It is usually the case that fewer bits would be required to pass references, which can be an advantage.

ITU 350 also includes collection management logic 380, which as will be described further herein, tracks status for ray collections stored in memory 340, and determines which collections are ready for processing. Collection management logic 380 is illustrated in FIG. 3 as connecting to memory 340, and which initiates delivery of rays for testing to each of the connected test cells. Where ITU 350 represents an example where GAD elements bound either other GAD elements or primitives, rather than some combination thereof, collection management logic 380, depending on whether a particular collection is associated with a GAD element that bounds primitives or other GAD elements, assigns rays either to test cells 340a-340n or test cells 310a-310n, respectively.

In examples where a particular GAD element may bound both other GAD elements and primitives, ITU 350 would have datapath for providing both GAD elements and primitives to each test cell, as well as rays, and collection management logic 380 would arrange for testing rays of collections among the testing resources. In such examples, because of the typical difference in shape between GAD elements and primitives (spheres versus triangles, for example), an indication to switch test logic or load an intersection test algorithm optimized for the shape being tested may be provided from collection management logic 380.

Collection management logic 380 also or in substitution may interface with test cells 310a-310n and test cells 340a-340n. In such variations, collection management logic 380 provides information to each test cell so that each test cell may initiate fetching of ray data for test from memory 340. Although collection management logic 380 is illustrated separate from memory 340, collection management logic 380 in implementations may be inter-related and implemented within circuitry of memory 340, as management functionality performed by management logic 380 largely relates to data stored in memory 340.

An ability to increase parallization of access to memory 340 by intersection test resources is an advantage of inventive aspects described herein. As such, increasing a number of access ports to memory 340, preferably up to at least one per test cell is advantageous. An example of such an organization and advantages of it are further described with respect to FIG. 6.

Figure 6:
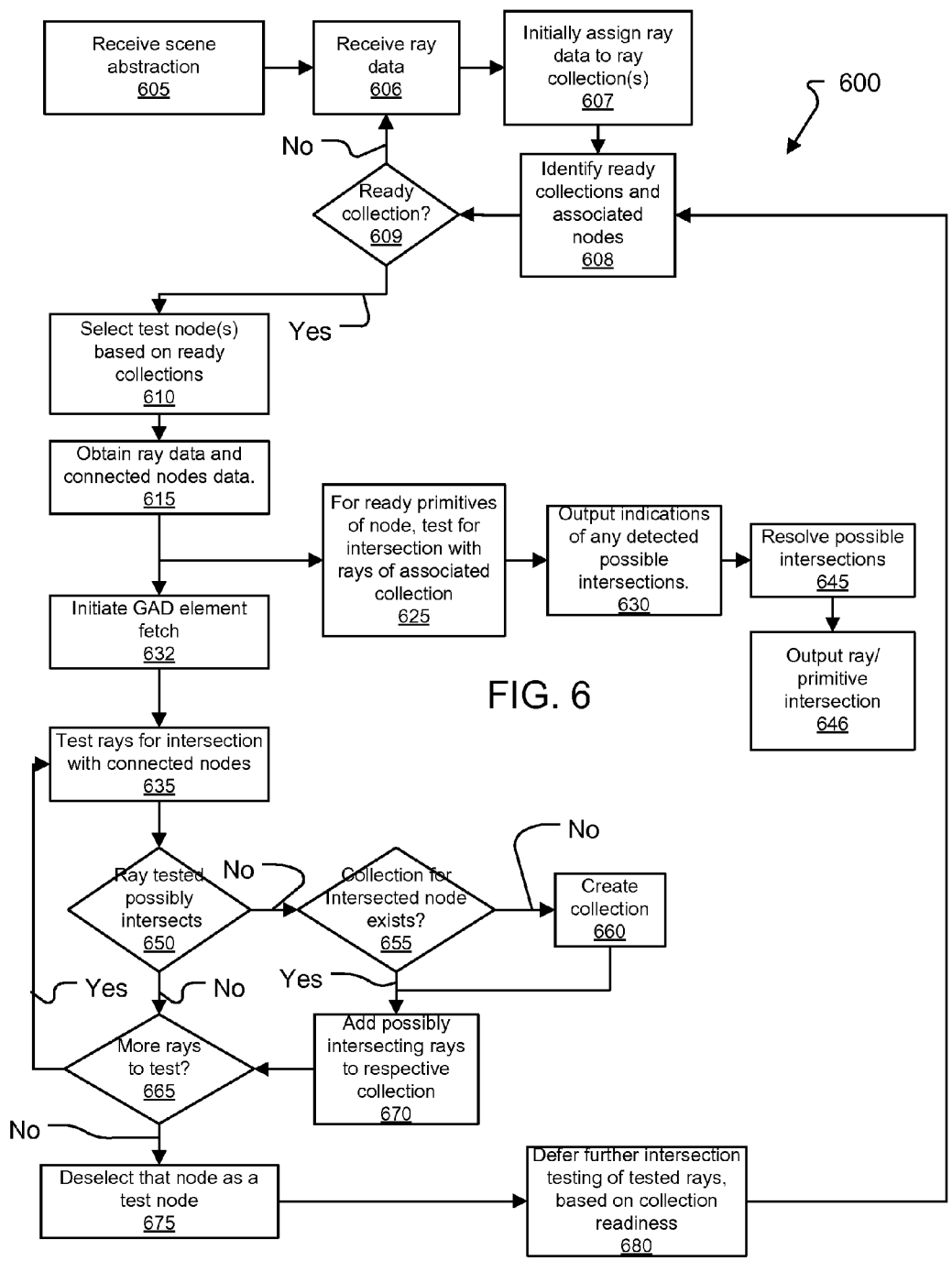
FIG. 6 illustrates exemplary method aspects that may be performed in an ITU.
Figure 7:
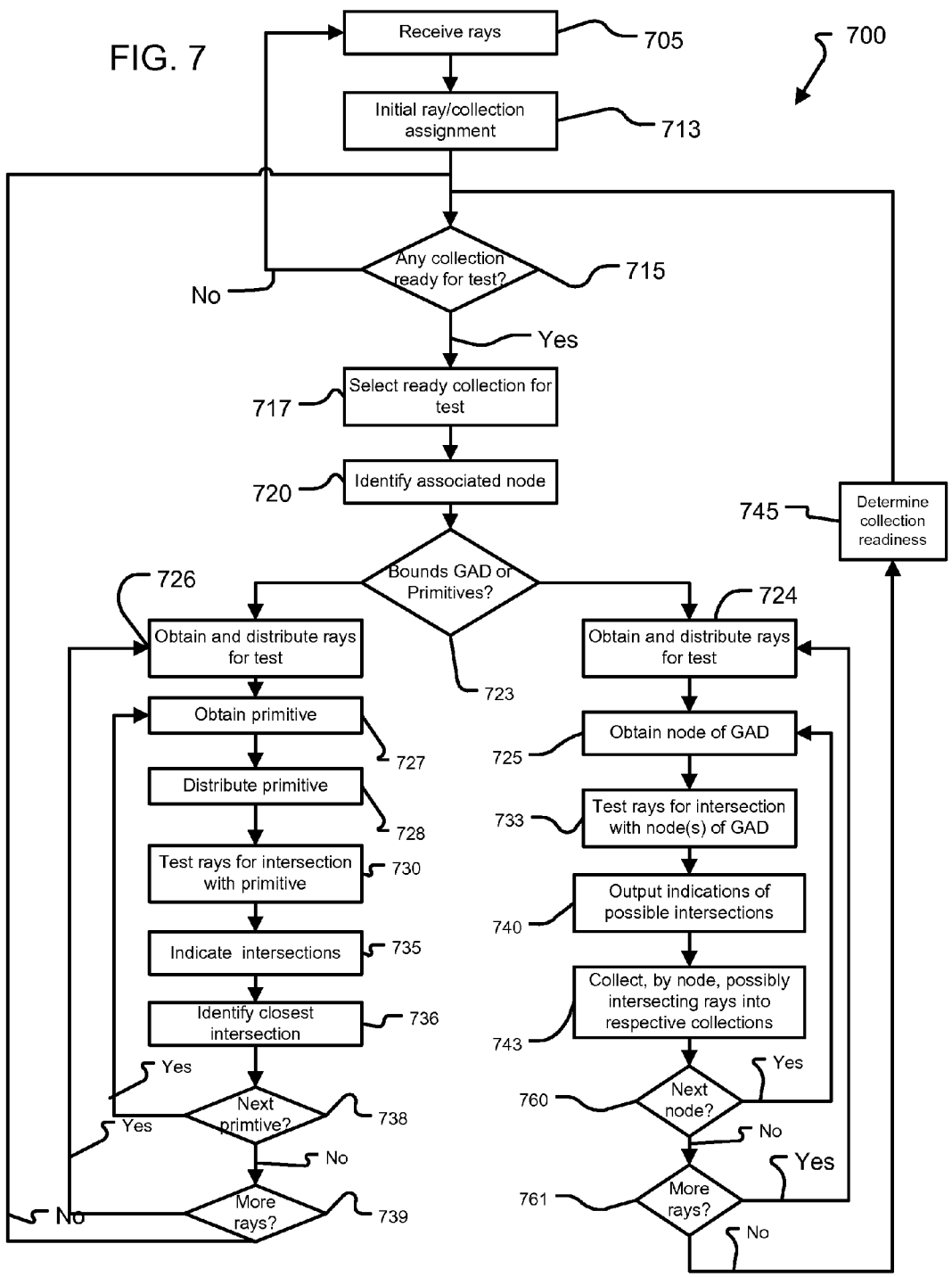
FIG. 7 illustrates further exemplary method aspects implementable in an ITU.

Examples of operation of ITU 350 are provided with respect to methods 600 and 700 of FIGS. 6 and 7.

Figure 4:
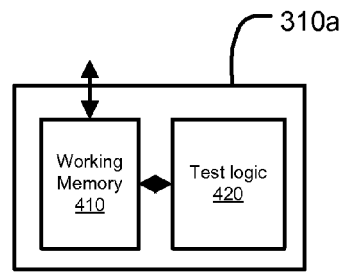
FIG. 4 illustrates aspects of an example test cell for use in the ITU.

FIG. 4 illustrates an example of a test cell 310a, which may contain a working memory 410 and test logic 420. Working memory 410 may be several registers, which contain information sufficient to test a line segment for intersection with a surface, or may be more complicated in other implementations. For example, working memory 410 may store instructions for configuring test logic 420 to test a particular shape received for intersection and may detect what shape was received based on the data received. Test logic 420 performs the intersection test at an available or selectable resolution, and can return a binary value indicating whether or not there was an intersection detected. The binary value can be stored in the working memory for reading out, or can be outputted for latching during a read cycle in memory 340.

Figure 5:
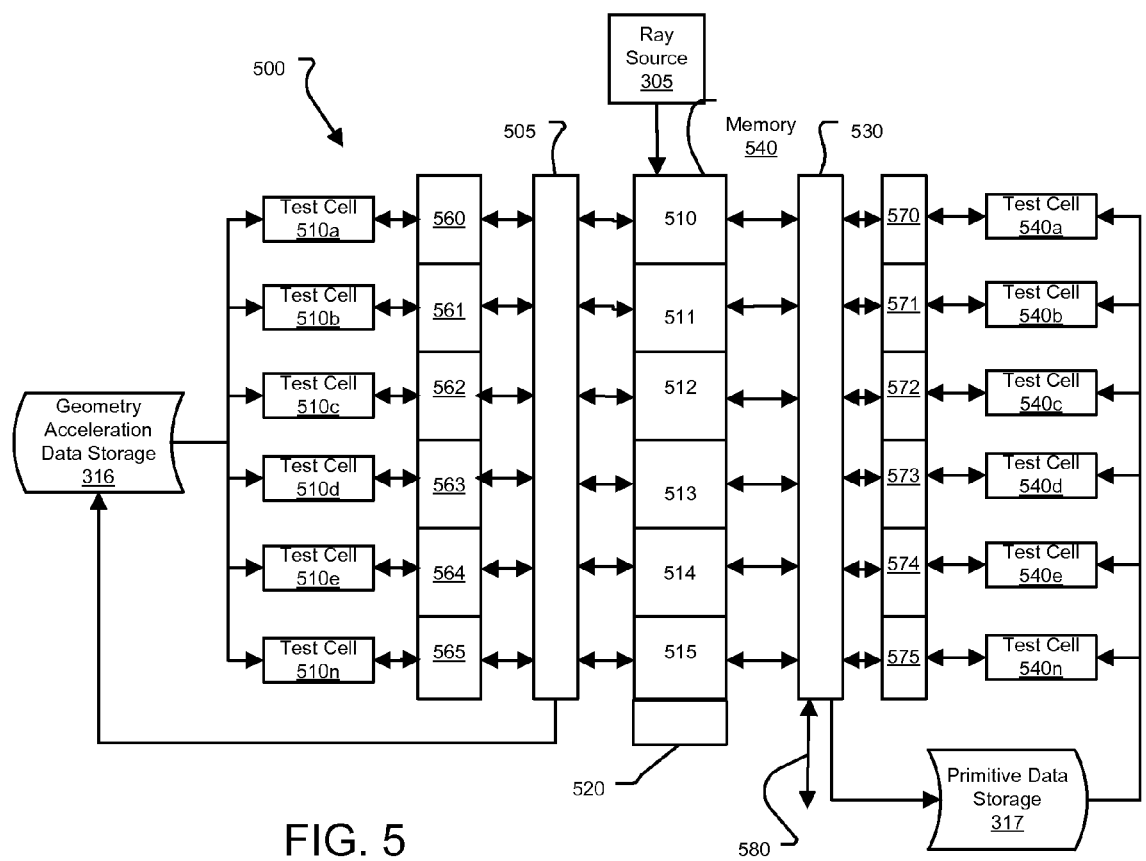
FIG. 5 illustrates further aspects of an intersection testing unit.

FIG. 5 illustrates aspects of an implementation of an intersection testing unit 500, focusing in more detail on an example memory organization. In ITU 500, test cells 310a-310n and 340a-340n again appear. This does not imply any requirement as to number of test cells. In this example, test cells 310a-310n are for intersection testing of GAD elements and test cells 340a-340n are for intersection testing of primitives. Thus, in ITU 500, both primitives and GAD elements may be tested in parallel. If it were determined, however, that more test cells of one variety or another would be required, then any test cell could be reconfigured as appropriate. As transistor density continues to increase, more such test cells can be accommodated. As will be described, portions of the test cells can be treated as a operational group, in that they will test rays against a common shape (i.e., a primitive or GAD element). Test cells 340a-340n can return binary values indicating an intersection with a primitive at a specified precision level (e.g., 16 bits), and can also return a more precise indication of where on the primitive the ray intersected, which can be useful for larger primitives.

In ITU 500, memory 540 comprises a plurality of independently operation banks 510-515, each of which has two ports. One port is accessed through GAD test logic 505, while the other is accessed through primitive test logic 530. Each of GAD and primitive test logic 505 and 530 operate to manage a flow of data between respective working buffers 560-565 and 570-575, and respectively to obtain GAD elements for test from GAD storage 316 and from primitive storage 317. The banks 510-515 are intended to operate, for the most part, to provide non-conflicting access to ray data by GAD and primitive test logic 505 and 530, such that each test cell 310a-310n and test cell 340a-340n can be provided a ray from separate banks of 510-515. A conflict can arise where two rays to be tested reside in the same bank, and in such cases, the accesses can be handled sequentially by the test logics 505 and 530. In some cases, working buffers 560-565 and 570-575 can be loaded for the next processing while other processing is completed.

By testing rays in consistent arrangements, tracking of which ray is assigned to which test cell can be reduced. For example, each collection can have 32 rays, and there may be 32 of test cells 310a-310n. For example, by consistently providing the $4^{th}$ ray in a collection to test cell 310d, test cell 310d need not maintain information about what ray was provided to it, but need only return an indication of intersection.

Storage for ray collection data can be implemented as ray collection buffer 331 and ray collection buffer 520, for each ITU 350 and 500 respectively. The Ray collection storage may be implemented as an n-way interleaved cache for ray collections, such that any given ray collection may be stored in one of n portions of ray collection buffer 331 or 520. Ray collection buffer 331 or 520 may then maintain a list of the ray collections stored in each of the n portions of the buffer.

An implementation of ray collection buffer 331 or 520 may include using an identifying characteristic of an element of GAD associated with a ray collection, for example, an alphanumeric character string that may be unique among the elements of GAD used in rendering the scene. The alphanumeric character string may be a number. The string may be hashed to obtain a reference value to one of the n portions of ray collection buffer 331 and 520. In other implementations, elements of GAD may be predestined for storage in a given portion of ray collection buffer 331 and 520 by for example mapping segments of the alphanumeric strings in use to portion(s) of such buffer. Primitive/Ray intersection output 580 represents an output for identifying potential primitive/ray intersections, output 580 can be serial or parallel. For example, where 32 primitive test cells 540*a*-540*n* exist, output 580 can include 32 bits indicating presence or absence of an intersection for each ray against the primitive just tested. Of course outputs could come directly from the test cells in other implementations.

Operational aspects of ITU 350 and 500 are described further with respect to FIGS. 6 and 7, below.

An overview of the following example methods of testing rays for intersection in a scene composed of primitives includes ITU operation of traversing a graph of GAD elements, each bounding selections of the primitives. During such traversal, collections of rays are tested for intersection with the GAD elements. A collection of rays can be formed by testing rays for intersection with a given GAD element, and then for those rays that intersect that element, a collection may be formed. Rays may continue to be tested for intersection with that given GAD element until its collection has a sufficient number of rays. Then, the rays of that collection may be tested for intersection with nodes of GAD elements connected to that GAD element. These aspects will be described in more detail below, with respect to FIGS. 6 and 7.

The following description relates to a method 600 of intersection testing depicted in FIG. 6. The method will be described relative to ITU 350, for simplicity. In 605, at least a portion of a scene abstraction comprising elements of GAD bounding selections of primitives composing the scene is received in GAD storage 316. The scene abstraction includes information relating the GAD elements, and in an example such information comprises a graph mapping GAD elements to nodes of the graph and edges between pairs of the nodes. Ray data is also received (606) in memory 340 from ray source 305. Collection management logic 380 operates to initially assign rays to collections, where each collection is associated with an element of GAD. For example, an element of GAD may be a root node of the graph, and all rays received are initially assigned to one or more collections associated with the root node. Reception of rays may also be in groups sized to be a full collection, and each such collection can be treated like a collection identified in ray collection buffer 331, for example.

In 607, rays are assigned initially to a collection (e.g., a collection for a root node or a sphere bounding a camera origin). In 608, collection(s) ready for test are identified by, for example, flagging as ready any collection having more than a predetermined number of rays. In 609, it is determined whether any collection is ready, and if not then more ray data is received (606), and if a collection is ready then a selection (610) of the ready collections is made and nodes associated with those collections are identified as test nodes.

Focusing on processing of one collection, with the understanding that a number of collections may be tested in parallel, retrieval (615) of rays of the collection associated with the test node from memory 340 is initiated by collection management logic 380, by for example, providing addresses of such rays, which are stored as data in the collection, to memory 340, which provides the ray data on plural output ports. The ray data may be destined for one or more of test cells 310*a*-310*n* and test cells 340*a*-340*n*.

In particular, example test cells 310*a*-310*n* are for testing GAD elements for intersection while test cells 340*a*-340*n* are for testing primitives for intersection. At 625, primitives ready for test are tested for intersection in test cells 340*a*-340*n*, where 625 can include a determination of whether primitives are ready for test, by for example determining whether there is a more granular node of GAD bounding that primitive. Such a determination can include simply identifying all geometric shapes connected to the node associated with the collection under test, and any primitives connected can be provided for test to test cells 340*a*-340*n*.

Determining whether primitives are ready for test varies based on an implementation of the scene abstraction provided (i.e., based on the nature of the GAD). For example, the GAD comprises a graph of GAD elements, each bounding a selection of primitives, and arranged as nodes of the graph, where pairs of the nodes are connected by edges. The selection of primitives bounded by each GAD element, and which pairs of the nodes are connected can vary in implementations. For example, a first element of GAD can bound a first primitive that is not bounded by another GAD element that is either smaller in volume or bounds only a subset of the selection of primitives bounded by the first element (higher granularity). However, other primitives bounded by the first element may be bounded by one or more other (more granular) GAD elements that bound a subset of primitives or are smaller in volume. Thus, in step 625, the first primitive would be ready for test, as it is not bounded by a more granular GAD element.

Any such ready-for-test primitives would be provided to test cells 340*a*-340*n*, along with rays of the collection associated with the node being tested. Where more than one such primitive exists, as would frequently be the case, the rays of the collection can be loaded in test cells 340*a*-340*n* and each primitive can sequentially be fed through the test cells, such that each primitive is tested against all the rays more or less in parallel. In 630, indications of any intersections are output. Because only a closest intersection for a given ray is generally of interest, at 645 a closest intersection is determined. A previously closest intersection can be maintained with the ray data and collection management logic 380 can determine whether any detected intersection is closer than the stored intersection, updating the ray data as appropriate.

With regard to testing GAD elements bounded by the node selected for test (i.e., the GAD element associated with the selected node bounds other GAD elements), distribution of the rays from the collection to test cells 310*a*-310*n* is done, and then fetching of bounded GAD elements is initiated at 632, meaning that collection management logic 380 inputs addressing information to GAD storage 316, which outputs the addressed GAD elements to test cells 310*a*-310*n*. Where multiple GAD elements are bounded, as is usually the case, the elements can be arranged to be streamed serially to test cells 310*a*-310*n* by a serializing buffer, if block reads of multiple GAD elements is provided.

In the test cells 310*a*-310*n*, each ray of the collection is tested for intersection with the serially provided GAD elements, and where a ray is determined to intersect (650), it is determined (655) whether a collection for the intersected GAD element exists, if so, then the ray is added to that collection, room permitting, and if not then the collection is created 660, and the ray is added. Where an existing collection has no room, then a new collection can be created.

In some implementations, a 1:1 correspondence of a maximum number of rays in a collection to number of test cells 310a-310n is provided such that all the rays of a collection can be tested in parallel against a given GAD element. However, if more rays are provided in a collection, then a determination that more rays of the collection need to be tested (665) is performed, and if so then the method continues from 635.

Otherwise, the node selected for test can be deselected (675) as a test node, as all the rays of its associated collection will have been tested against bounded primitives, and/or bounded GAD elements, and thereby will have completed processing or have been distributed into other collections associated with other GAD elements. As such, the step 680 is performed that testing of the rays of this associated collection are not further pursued at this time, but rather may be deferred for an indefinite period as other collections are processed. The method 600 then returns to 608, where collection readiness is determined by collection management logic 380. Collection readiness determination can involve a number of calculations and determinations. Simplistically, it can entail determining or examining a fullness level of each collection and selecting the fullest of the collections. Because collections correspond to elements of GAD, other determinations can include determining to complete testing for a given element or elements of GAD, and selecting collections associated with those elements as ready for test. Alternatively, collection readiness can be determined that a given collection holds ray(s) that already have been completely tested through other portions of the graph of GAD elements, and completion of that ray depends on processing the given collection. If storage for ray collections is allocated in fixed size areas, then collection management logic 380 can also determine that a collection with only a small number of rays, and which has not had a ray added for some time should be selected as ready for test to free up the space used by that collection for other more productive collections. Also, a large number of rays initially may be received such that an available amount of ray collection storage space can be filled. Where ray storage is full, but other mechanisms for determining collection readiness do not trigger enough ready collections, random or heuristic selections of collections for further processing may be implemented. Other expediencies and selection criteria can be implemented.

With respect to ITU 350 and method 600, it was assumed that test cells 310a-310n and 340a-340n tested only one of GAD elements and primitives, respectively. However, in a sense, both the primitives and the GAD are geometric shapes, e.g., a triangle and a sphere. Therefore, there need not be an apriori determination whether one or the other of these types of shapes is bounded, or otherwise enclosed, by a particular node of GAD. Rather, a reference to the geometric shapes bounded by a particular node of GAD can be maintained, and the data associated with that reference can be fetched. In some aspects, a type of shape can be inferred for a size of the data describing that shape. Test cells 310a-310n and 340a-340n can be made reconfigurable to intersection test the type of shape provided to it. In such circumstances, GAD storage 316 and primitive storage 317 would each have a connection to each test cell 310a-310n and 340a-340n. It may however, continue to be expedient from a datapath complexity perspective not to have to run an independent connection between each memory and each test cell, as may be implemented to allow complete configurability and selectability of geometric shape testing in each test cell.

The following description relates to a method 700 of intersection testing depicted in FIG. 7, and which describes an implementation aspect where GAD for a particular scene is arranged in a hierarchical graph. In this example, the GAD is limited to bound either elements of GAD or primitives, rather than a potential combination of both. Such an example implies that only leaf nodes of the GAD graph would directly bound primitives (i.e., only leaf nodes would bound a selection of primitives that are not bounded by another, more granular, element of GAD).

In method 700 of intersection testing, actions may be attributed to a particular structure, and data may be identified as being stored in a particular memory resource. However, these are examples of an implementation, and method aspects are not limited to such examples. Method 700 commences with receiving (705) rays for intersection testing in a scene. The rays are initially assigned (717) to a ray collection associated with a node of GAD in the graph. For example, the rays can be assumed to intersect a root node of the graph, or a node encompassing a camera position from which the rays were emitted. After such initial assignment, it is determined whether any collection is ready for test (715). Because a large number of rays are usually initially transmitted, one or more ray collections are almost certainly ready for test, and a selection (717) of ready collection(s) is made. Initially transmitted rays can also be received as full collections and treated in an input queue like collections stored already in ITU 350 or ITU 500. In an example, one ready collection is selected, and the ready collection includes no more than one ray for each test cell of ITU 350 or 500, such that all the rays of a given collection can be tested in parallel. Collection management logic 380 or GAD test logic 505 may select ready collections for test, by for example maintaining a list of ready collections and taking a first entry on the list, or another entry. Flags indicating readiness of nodes can also be set and checked.

After selection of ready collection(s) (717), a node of the GAD graph is identified (720) for each selected collection by collection management logic 380 or GAD test logic 505, and each logic determines whether such node bounds either primitives or other GAD elements (i.e., other nodes). Node/collection associations may be managed within collection management logic 380 and GAD test logic 505. Differentiation between bounding primitives or other GAD elements can be made based on a bit indication, or based on determining what kind of references a collection may contain, or other acceptable means.

Concerning primitive bounding first, if the GAD element bounds primitives then collection management logic 380 or primitive test logic 350 initiates fetching (726) of ray data from memory 340/540, and distribution (726) of the rays among test cells 340a-340n and 540a-540n, respectively.

Also, each logic 380 and 530 initiates fetching (727) from primitive data storage 317 of bounded primitives. Such fetching can be performed as a block or as a stream, although in this example, each primitive is fed in common to each of test cells 340a-340n and 540a-540n, such that a stream of primitives can be created by a buffer or other suitable device if a block read from primitive data storage 317 is performed. In these example ITUs, it is contemplated that primitive data is fed directly from primitive data storage 317 to each test cell 340a-340n, as in these examples, different rays of a collection are distributed (728) among test cells for testing against a common primitive, as described below. Such a buffer is not a cache in the sense that primitives and/or GAD elements are not stored therein for repeated processing, but instead are generally discarded from ITU memory after testing against collection(s) of rays.

In ITU 350, ray distribution is initiated by logic 380, and ray data is provided directly from memory 340 to each test cell 340a-340n. For ITU 500, ray data can be obtained from memory by test logic 530, and provided to buffers 570-575. Test logic 530 may maintain a queue of requests for each memory bank 510-515, for situations where more than one ray in a given collection is stored in the same bank. In both cases, rays can be identified in a given collection by references, such as memory location references that identify a start of data for a ray, and rays can be of a predetermined size.

Thereafter, rays are tested 730 for intersection with the primitive provided to the test cells (i.e., each test cell has a different ray and tests that ray with a common primitive, in this example.) After testing (730) of rays for intersection, each test cell 340a-340n, 540a-540n indicates detected intersections. Because these intersections are of primitives and rays, the only intersection that typically matters is the first one. In ITU 350, rays can be tested for intersection out of order (i.e., can be tested against primitives farther from a ray origin first), and so a mechanism to track a closest intersection is provided. For example, data stored with the ray indicates a closest intersection for the ray identified to that point. This closest intersection data can be fetched by the test logic 380 and 530, but need not be provided to the test cells. Instead, test logic can retain that data, and compare distances of detected intersections returned from test cells to previously identified closest intersections, and where closer intersections have been identified, update appropriate ray data with that closer intersection. Although requiring more storage space, all intersections could be stored in the ray data and a closest one determined after complete intersection testing, or such data could be used for optimization and analysis.

After closest intersection resolution 736, it is determined whether more primitives bounded by the node of GAD remain to be tested (738), if so, then the process repeats from 727, where those primitives are fetched. In implementations, this step 738 can be implemented as a loop for a predetermined number of primitives. If no primitives remain to be tested, then the process returns to identify another collection ready for test (715).

In some examples, a 1:1 correspondence is maintained between a number of rays in a collection and a number of test cells 340a-340n or 540a-540n, such that all the rays of a collection can be tested against a primitive at once, and such that rays are stationary in the test cells as primitives are streamed to the test cells. However, where more rays exist in a collection than test cells, or if all rays were not tested, then method 700 can include a further loop point 739 where those additional rays are fetched 726, and the process then repeats from 726. Otherwise, method 700 continues from 715, where it is determined whether a collection is ready for test.

Concerning a collection associated with a node bounding other GAD elements, method 700 includes that GAD test logic 505 and collection management logic 380 would obtain and distribute (724) rays of the collection to test cells 540a-540n and 340a-340n, respectively. Similar to the primitive fetching, each of logic 505 and 380 initiates the production (725) of GAD elements for reception by the test cells, and in examples, the reception by the test cells of the GAD is like a serial stream. The GAD elements obtained (725) here are those GAD elements connected to the node associated with the collection (e.g., if a collection associated with node 220 of FIG. 2 were selected, then GAD elements for nodes 215, 241, 221, and 230 would be fetched.

Each ray of the collection is tested (733) in its test cell for intersection with the GAD element provided to the test cells. Indications of intersections are output (740) from the test cells to logic 380 and 505. Logics 380 and 505, where an element of GAD is tested in common among the test cells then records each detected intersection of the rays tested for that GAD element. Since testing in this example proceeds serially through the GAD elements, Logics 380 and 505 can record a reference to an intersecting ray in the collection associated with that GAD element, to collect by node the possibly intersecting rays (743). In a case where other rays already were annotated for intersection with that GAD element (i.e., because collections of rays can be stored and deferred until ready, some rays could have been identified as intersecting in previous testing, and testing of those rays would occur when the collection was later determined ready for processing).

It is determined (760) whether more GAD elements for connected nodes remain to be tested, and if so, then such nodes are obtained (or loaded) into the test cells. If all GAD elements for connected nodes were tested, then at 761, it is determined whether more rays of the collection remain to be tested (where a 1:1 correspondence of rays to test cells is not implemented). If all rays were tested, then processing continues with determining readiness of collections currently existing (745) and then at 715 where the readiness conditions are used to determine whether to obtain more rays (705) or to proceed with further collection testing. If more rays are to be tested (761), processing continues from 724.

Of course, it should also be understood that where more primitives, GAD elements, or rays are to be tested, then the fetching of any such data can occur in parallel with the testing, and the serial nature of the explanation does not imply serial performance of the process.

Also, because testing resources exist for both primitives and GAD elements in ITU 350 and ITU 500 (i.e., test cells 340a-340n and test cells 540a-540n, respectively), the steps of identifying collections ready for test can occur in parallel for (1) collections that are associated with a GAD element bounding primitives and (2) for collections bounding associated with GAD elements bounding other GAD elements (i.e., nodes of the graph bounding other connected nodes.) Therefore, multiple collections can be in process at a given time.

Because the output from testing rays for intersection with GAD elements differs from testing the same rays for primitive intersection (i.e., intersection with a GAD element results in collection into a collection for that GAD element, while intersection with a primitive results in determination of a closest intersection with that primitive, and output of such intersection), conflicts to write back collection data or output intersections should not normally occur, even where a particular ray happens to be in two collections being tested in parallel. If further parallelism were to be implemented, for example, by testing multiple collections of rays for primitive intersection in multiple instantiations of test cells 340a-340n, then features can also be implemented to enforce orderly completion of such testing, such as storage of multiple intersections, or lock bits, and the like.

In sum, method 700 includes receiving rays, assigning them to collections, selecting for test ready collections, where readiness can be algorithmically determined, assigning rays of the selected collections to appropriate test cells and streaming appropriate geometry for intersection test through the test cells. Outputs depend on whether the geometry are scene primitives or GAD elements. For rays tested against GAD elements, the GAD elements are identified based on graph connection with the node associated with the collection being tested, and rays are added to collections associated with the GAD elements being tested. The collections are reviewed for readiness and selected for test when ready. For ray intersections with primitives, a closest intersection is tracked with the ray. Because rays are tested when associated with ready collections, it is implicit that intersection testing for a particular ray is deferred until a collection with which it is associated is determined ready for testing. Rays can be collected coincidentally into multiple collections, which allows such rays to be tested against disparate portions of scene geometry (i.e., they need not be tested in order of traversal).

As discussed above, in some implementations, elements of GAD can be selected and interrelated with each other such that a particular GAD element does not bound directly both another GAD element and primitives, and instead primitives are directly bounded by a distinct GAD element (this implementation can be called a homogenous implementation, in that GAD elements and primitives are not "mixed" within a given element of GAD). This GAD arrangement may be useful because it facilitates testing of GAD elements and primitives in test cells optimized or otherwise configured for testing that particular type of shape for intersection. This implementation choice may affect an allocation of rays to test cells, where test cells are optimized for testing the GAD elements or primitives, since it would be preferable, where available, to allocate each type of shape to an optimized tester. Method 700 can be adapted for any construction of GAD, whether homogeneous or otherwise based on the description provided herein.

In the above methods 600 and 700, rays were loaded from a memory based on information provided in a collection of rays. Therefore, such loading may include determining respective memory locations where data representative of each ray is stored. Such data may be comprised in the ray collection, in that a ray collection may include a list of memory locations or other references to storage, at which ray data for the rays in that collection are stored. For example, a ray collection may comprise references to locations in memory 385; these references may be absolute, offset from a base, or another suitable way to reference such data.

Also, methods 600 and 700 were described from the perspective that ray data would be "stationary" in test cells as either primitives or GAD elements were cycled through the test cells. However, implementations can also fix either primitives or GAD elements in test cells and cycle rays through them. Such a situation may be advantageous where a number of ray collections associated with the same GAD element were ready for test. The operation of ITU 350 and ITU 500 can be altered to accommodate such variations or opportunities as they present themselves. Other implementations may be provided, including duplication of a ray in multiple test cells, such that each test cell tests a portion of the elements of GAD for intersection.

More complicated test cells may also be provided, which can cycle through both a list of the rays and a list of the elements of acceleration data. In such an implementation, each test cell could test a collection of rays for intersection with all appropriate elements of GAD. However, such an implementation would likely require a larger memory 440 and a higher bandwidth interface to keep all the test cells supplied with rays and elements of GAD for a complex scene in view of present technology limits. As technology advances, such an implementation may become more desirable, and could be viewed, in a sense, as replicating ITU 350 multiple times, since keeping either a ray or a particular element of GAD stationary in a test cell would continue to have advantages, including that each test cell would require a smaller working memory, which in implementations having dozens, hundreds, or even thousands of test cells, is a practical advantage.

Example methods and apparatuses can identify exploitable latent parallelism among rays. As described with respect to FIG. 4, above, a memory in an ITU, such as ITU 350 or ITU 500 would be able to store a given maximum amount of rays. It is to be expected that the maximum number of rays that can be stored in such an ITU is less than a number of rays that would be tested to completely render the scene, given considerations such as complexity and cost. Therefore, rays are conditionally accepted during rendering of a scene by the ITU. A condition of accepting new rays from the ray input is that the memory has space available for storing data representative of the new rays. The rays can be accepted in numbers approximating a full collection, and can be identified as ready for processing against a default group of shapes (e.g., a root node of a graph of GAD elements).

As previously addressed in many examples, the ITU stores in a memory, information representative of rays previously received from the ray input. The ITU, for these rays, maintains an association of each ray with one or more ray collections of a plurality of collections. The ITU also maintains indications of collection fullness for the plurality of collections stored in the memory. These indications may be respective flags indicating full collections or may be numbers representing a number of rays associated with a given collection.

The ITU selects rays for intersection testing on a collection by collection basis (as described above), and here, the ITU selection is biased to select full collections from among the plurality of collections. Where full collections are not available, new rays are selected for testing. Where full collections and new rays are not available (e.g., because there is no memory available to store them, and hence they are not accepted), partially full collection(s) from among the plurality of collections are selected by the ITU. The ITU accesses an association of ray collections to respective groups of shapes (which was identified in previous examples as a graph of GAD elements, for example, or groups of primitives bounded by an element of GAD. The ITU operates to indicate intersections and process them largely as described above. Selecting partially full ray collections encourages product of secondary rays that increase available rays from which to identify parallelizable ray collections. Here, secondary rays is viewed as including any ray generated as a result of an identified ray/primitive intersection, and the ray involved in the intersection need not have been a camera ray, and thus "secondary rays" can be any number of ray/primitive intersections removed from a camera ray. Each time another ray is emitted as a result of shading a ray/primitive intersection, the new ray can be considered as a new "generation" for convenience. Thus, in many described inventive aspects herein, an advantage is that these aspects function to collect rays from any generation together for testing, and in some operational modes encourages generation of many rays from any generation, to provide a better distribution of rays in the scene to allow more parallelization of ray intersection testing.

Also, because each ITU 350 or ITU 500 includes a finite number of test cells, and requires some finite time to determine whether a given ray intersects with a shape, an ITU has a maximum throughput. In these examples, maintaining actual throughput closer to a maximum throughput of an ITU according to these disclosures indicates efficient usage of testing resources. Methods and apparatuses described provide for efficient intersection testing by predominantly testing full collections of rays. Also, it was described above that a sequence of ray collections can be tested in the ITU 350 or 500, and groups of primitives can be cycled through for each ray collection (e.g., 32 ray collections can each be tested against 32 GAD elements). Therefore, inputs specifying what collection of rays to test next can be viewed as a sequence of ray collections. Preferably, this sequence is filled with full collections, either of previously inputted rays, or of new rays. However, at times, it has been found to be desirable to encourage production of a wide variety of secondary rays from potentially a variety of origins and directions by selecting partially full buckets, for example in a round robin fashion.

Figure 8:
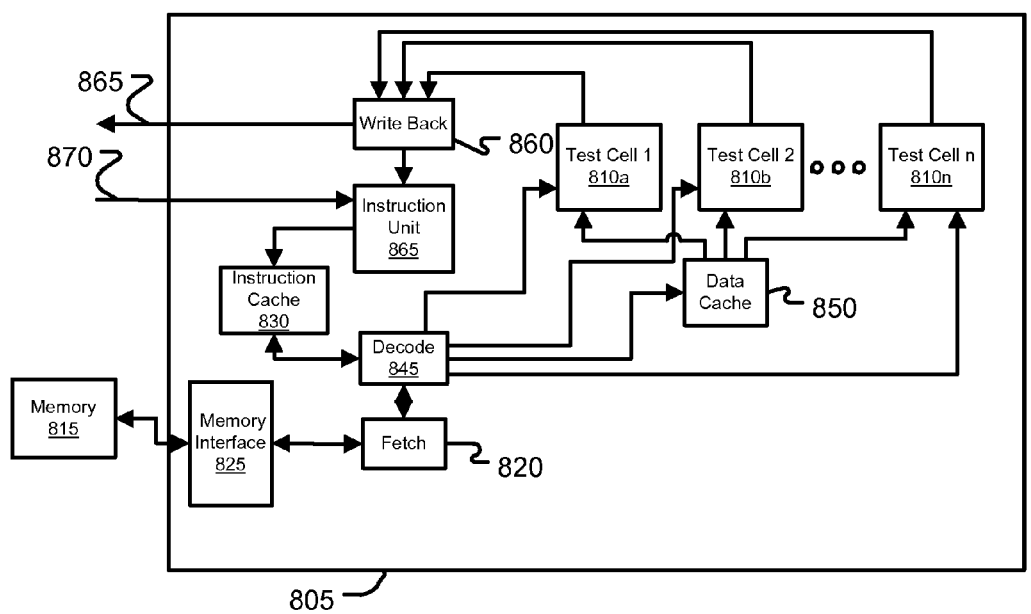
FIG. 8 illustrates an processor oriented implementation for intersection testing according to described testing aspects.
Figure 9:
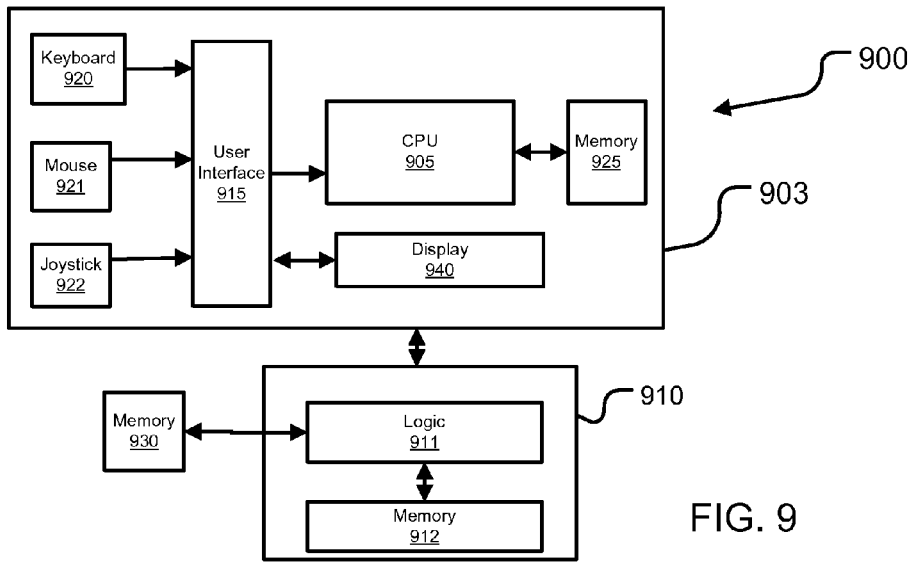
FIG. 9 illustrates a system that may use a hardware accelerator ITU according to this description.

The above described ITUs are examples of implementations that focus more on hardware control, and which may be more suitable for implementation as a dedicated accelerator. However, inventive aspects can also be implemented in a more software oriented implementation that may use special purpose instructions. Aspects of such an implementation are presented with respect to FIG. 8. In particular, a processor 805 comprises a fetch unit 820 coupled to a memory interface 825, an instruction cache 830, an instruction decoder 845, and a data cache 850. Data cache 850 feeds test cells 810a-810n. Instruction decoder 845 also provides input to test cells 810a-810n. An instruction generator 865 provides instruction input to instruction decode 845. Test cells output indications of detected intersections to write back unit 860, which in turn can store data in data cache 850. Output from write back unit 860 is also used as input to instruction generator 865 when generating instructions. It is contemplated that instructions used in such a processor 805 may be of a single instruction, multiple data variety, where the instructions processed in the test cells are intersection tests between defined surfaces and rays.

In an example, the "instruction" may include one of a primitive or an element of GAD, and the multiple data elements may include separate rays for testing against the primitive or element of GAD provided as the "instruction." The additional information with the instruction can be complicated or simplistic. For example, if processor 805 is a complicated, full-featured processor, then it may also have a large instruction set, and there may be a number of bits needed to differentiate an intersection test instruction from other instructions. Also, a variety of intersection test instructions may be provided, including for different primitive shapes and different GAD element shapes, or even for different testing algorithms, as appropriate.

In a typical example, each intersection test instruction would contain a reference to a geometry element, either being an element of GAD or a reference to a primitive, and references to a number of rays to test for intersection with the geometry element. Decoder 845 interprets the instruction to determine the reference to the geometry element, and initiates a fetch of the element through fetch 820 and memory interface 825. In some implementations, decoder 845 can lookahead a number of instructions to initiate fetching of geometry elements needed in the future. The geometry element can be provided by fetch 820 to decoder 845, where decoder 845 provides the geometry element to test cells 810a-810n. Decoder 845 also provides instruction information appropriate for test cells 810a-810n to perform the desired test, where multiple tests are possible.

Decoder 845 also provides the ray references from the instruction as functional addresses to data cache 850, which provides respective data sufficient for intersection testing of each ray to each of test cell 810a-810n. Data cache can be implemented as one or more hardware units. Data associated with the ray, which is not needed for intersection testing need not be provided.

The geometry element is tested for intersection with respective rays in each test cell 810a-810n, and an indication of intersection is output from each test cell 810a-810n for receipt by write back 860. Depending on the nature of the geometry element tested, write back 860 performs one of two different functions. Where test cells 810a-810n were testing a primitive for intersection, write back 860 outputs indications of each ray that intersected the primitive being tested. Where test cells 810a-810n were testing an element of GAD, write back provides the outputs of test cells 810a-810n to instruction unit 865.

Instruction unit 865 operates to assemble future instructions that will instruct test cells in further intersection testing. Instruction unit 865 operates with test cell 810a-810n input specifying which rays intersected a given element of GAD, instruction cache 830 and with inputs from GAD input 870, as follows. With the inputs from test cells 810a-810n, instruction unit 865 determines, based on GAD inputs, elements of GAD that are connected to the element of GAD specified in the inputs from the test cells 810a-810n. Instruction unit 865 determines whether an instruction stored in instruction cache 830 already exists for each element of GAD identified as connecting, and whether that instruction can accept any further ray references (i.e., are all data slots of the instruction filled). Instruction unit 865 adds as many of the rays identified as intersecting in the test cell input to that instruction and creates other instructions sufficient for receiving the remaining ray references. Instruction unit 865 does this for each element of GAD identified as connecting with the element identified in the test cell input. Thus, after processing the test cell input, rays identified as intersecting are each added to instructions specifying testing of the rays against connected elements of GAD. The instructions may be stored in instruction cache 830. Instructions may be organized in the instruction cache 830 based on the organization of the elements of GAD received from GAD input 870.

For example, GAD input 870 may provide a graph of GAD, where nodes of the graph represents elements of GAD, and pairs of nodes are connected by edges. The edges identify which nodes are connected to which other nodes, and instruction unit 865 may search instruction cache 830 by following edges connecting nodes, in order to identify which instructions are already in the cache for a given element of GAD, and where new rays may be added. Where multiple instructions exist for a given GAD element, they may be linked in a list. Other methods, such as hashing a GAD element ID to identify potential locations in instruction cache 830 where relevant instructions may be found can also be implemented. Instructions can also reference a node of GAD under test, such that the instruction would cause fetching of connected nodes of GAD, in response to the instruction being issued and decoded. Each such connected element can be streamed through test cells 810a-810n for test with respective rays maintained in each test cell.

Thus, a processor implemented according to these examples would provide functionality to obtain or otherwise create instructions that collect rays identified for intersection with a first node for intersection test against connected nodes. As with the examples described above, if the GAD provided to processor 805 is hierarchical, then the graph of GAD may be traversed in hierarchical order. The intergenerational ray collection aspects described above with respect to ITUs 350 and 500 can also be applied to the system described with respect to FIG. 8.

The example connections and sources of GAD are exemplary and other arrangements are possible. For example, memory 815 may be a source for GAD elements.

In practical ITU implementations, intersection test must be performed at a selected precision level (e.g., 8 bits, 16 bits, 24 bits of precision, etc.). In some implementations, an implemented ITU can perform intersection testing at high precision, such that a location of the intersection between a ray and a GAD element or primitive at a desired precision can be determined without further testing.

In other aspects, implemented ITUs can perform a lower precision, preliminary test for intersection between rays and GAD elements/primitives, which may result in detection of more possible but false intersections than a higher precision test (i.e., false positive intersections). After the detection of these preliminary intersections, a higher resolution intersection test can be conducted to determine which of these primitives a given ray first intersects. In most common shading algorithms, the first intersected primitive is the primitive used in ray shading calculations. Performing a lower precision test first can avoid doing a higher precision, more computationally intensive intersection test for rays and primitives that clearly do not intersect. A more precise indication of intersection location may be indicated with a geometry-centric representation of that information. For example, the intersection location can be indicated relative to one or more of vertexes describing a triangular primitive.

The above methods and systems that implement them can be viewed as implementing processes that can accept rays for intersection testing with respect to elements of a scene, the processes operate to test rays against elements of GAD to form collections of rays based on whether each ray intersects each GAD element. Thus, a result of such testing is that a number of collections can be formed, each associated with a GAD element. Because in these examples GAD elements are arranged in a graph, with edges connecting pairs of nodes, a next step for testing any given collection of rays is to test the rays of the collection for intersection with GAD elements (i.e. nodes of the graph) connected by edges to the node to which that collection is associated. However, that next step is deferred until the collection of rays is ready for test, in favor of pursuing testing of other rays for intersection. First, the processes can determine whether another collection of rays is ready for test, and if so, then that collection can be scheduled for test. If no other collection is ready for test then if there is available memory space to accept more rays for intersection testing, then more rays are accepted and tested. However, if there is not enough available memory space, then collections of rays can be selected for testing, potentially pseudorandomly or employing a heuristic. Such heuristic selection can continue until memory space is made available or collections are determined ready, for example, by reference to a fullness indication. Then, if collections are ready, they are tested, and if memory space is available, new rays are accepted and tested.

Heuristic selection methods can be identified by testing or otherwise monitoring how a degree of utilization of intersection testing resources, and if a heuristic can provide better long term or average utilization, then it may be used.

The process thus implemented primarily pursues intersection testing of full ray collections, and secondarily seeks to fill an available memory space with rays being processed. Where there are no full collections and insufficient memory space available, collections are tested from a pseudorandom or heuristic selection. The processes thus advances testing of rays with sufficient spatial coherence, when possible, while testing as many rays as practical given a provided memory storage, and where an insufficient number of rays have spatial coherence for more efficient intersection testing, generation of rays from a plurality of different origins and directions is encouraged to allow aggregation of a sufficient number of rays to increase efficiency of intersection testing. These aspects are accomplished elegantly in the example implementations. However, other implementations may also employ the disclosure of such aspects, and are considered within the scope of the invention and its equivalents.

Still other aspects that can be discerned from the above disclosures include that these aspects provide for iterative exclusion or narrowing of primitives that need to be tested for intersection, while deferring testing of rays for intersection until a suitable amount of rays is collected and ready for test against a defined set of objects. The rays of any collection can include camera rays, or any other type of ray that resulted from shading calculations or other operations for sampling light or shadow, such that the methods have an effect of allowing more structured and predictable accesses to scene acceleration data and scene primitives when testing a number of rays for intersection, even where those rays may have dissimilar origins and directions. In other words, such exemplary methods allow identification of rays that have different origins, directions, and purposes but still can be tested for intersection in parallel with common elements of acceleration data or primitives.

The identification of such rays can be dispersed over time, while other rays and other acceleration data or primitives are tested. In practice, these aspects also manifest themselves as collecting rays of different generations for testing in parallel, meaning for example, that a primary camera ray may be tested for intersection against GAD elements in parallel with a secondary ray spawned to test a specular reflection of an entirely different object in an entirely different part of the scene, where that secondary ray may be related to a completely different camera ray. To summarize, these methods and systems operate to extract latent ray coherency from large groups of rays traveling in a scene having any number of different origins and directions, and use that extracted latency to enable parallelized intersection testing and conservation of memory bandwidth to allow direct access to larger cheaper memories without intermediating caches of scene primitives or GAD elements. This method can also include specifically allowing, and even encouraging, widespread scattering and availability of secondary rays (i.e., rays that are not camera rays), regardless of what camera ray they relate to, or their respective origin and direction, and collecting such rays and potentially other rays (e.g., camera rays), over time by testing rays for intersection with GAD elements. As such, other implementations of such a method may be conceived based on the disclosures herein, including variations on the dedicated hardware approach and the SIMD approach examples described above.

Most of the above aspects were described from the perspective that separate ray data and ray collection data were maintained. However, in some implementations, that separation need not be so explicit or apparent, in that ray collection data and ray data can be maintained as a content associative database for example, where associations between collections and rays, and between collections and elements of GAD are maintained and used to identify rays associated with collections for test, and also elements of GAD associated with the collections.

Aspects of methods described and/or claimed may be implemented in a special purpose or general-purpose computer including computer hardware, as discussed in greater detail below. Such hardware, firmware and software can also be embodied on a video card or other external or internal computer system peripherals. Various functionality can be provided in customized FPGAs or ASICs or other configurable processors, while some functionality can be provided in a management or host processor. Such processing functionality may be used in personal computers, desktop computers, laptop computers, message processors, hand-held devices, multi-processor systems, microprocessor-based or programmable consumer electronics, game consoles, network PCs, minicomputers, mainframe computers, mobile telephones, PDAs, pagers, and the like.

The above description relates mostly to implementation of functionality within an ITU. However, the ITU will generally exist in the context of larger systems and components of systems. For example, any of processing can be distributed over networks, such as local or wide area networks and may otherwise be implemented using peer to peer technologies and the like. Division of tasks can be determined based on a desired performance of the product or system, a desired price point, or some combination thereof. In embodiments implementing any of the described units at least partially in software, computer-executable instructions representing unit functionality can be stored on computer-readable media, such as, for example, magnetic or optical disks, flash memory, USB devices, or in networks of storage devices such as NAS or SAN equipment, and the like. Other pertinent information, such as data for processing can also be stored on such media.

For example, computer system 900 comprises a host system 903 which comprises a CPU 905 interfacing with a memory 925 and a user interface 915 that may receive input from keyboard 920, mouse 921, and joystick 922, for example, and provide output to display 940. Host system 903 interfaces with hardware accelerator 910, which comprises logic 911 interfacing with onchip memory 912 (e.g., SRAM) and offchip memory 930 (e.g., DRAM). The combination of logic 911 and memory 912 may implement the ITUs described above. Software runs on CPU 905, including a driver for hardware accelerator 910. The driver would provide rays to logic 911, and would receive identified ray/primitive intersections to be used in shading calculations, and other calculations necessary for production of a rendered scene for display. Memory 930 may provide storage for geometry acceleration data, and primitives. These also be may be received from host 903.

Figure 10:
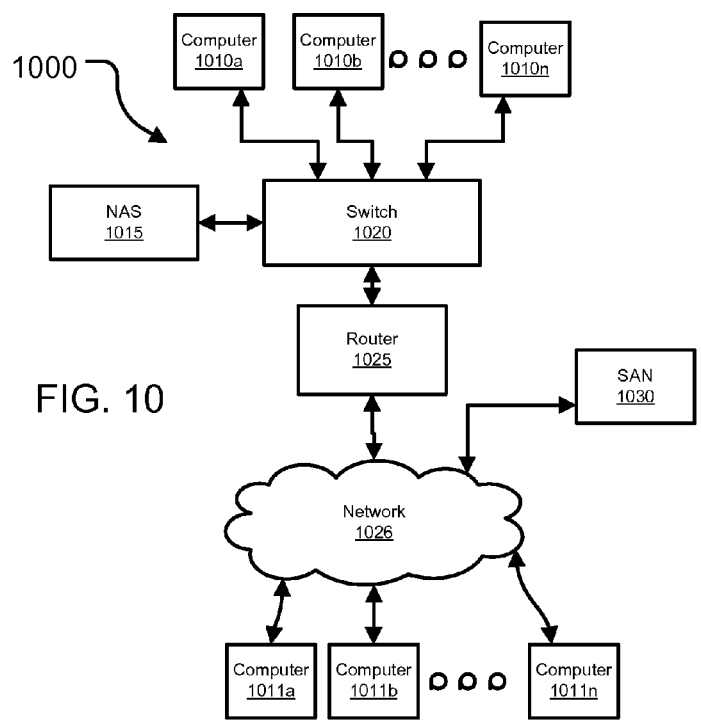
FIG. 10 illustrates a rendering farm that may use systems according to FIG. 9.

FIG. 10 illustrates a rendering farm 1000 comprising a plurality of computers 1010*a*-1010*n*, any subset of which, or all being equipped with hardware accelerator 910. The computers 1010*a*-1010*n* are connected on a LAN by switch 1020, which connects to router 1025 and to network area storage (NAS) 1015. Router 1025 connects to network 1026, which may be an internet, the Internet, a private network, or some combination thereof. Network 1026 provides access to storage area network resources 1030, and to other computers 1011*a*-1011*n*, which also may be equipped with hardware accelerators 910. Where a large amount of rendering is required, such a render farm may be employed to distribute rendering among multiple processing resources. Each computer illustrated can be provided a number of scenes to render and would use hardware accelerator 910 to accelerate such rendering.

In this description and in the following claims, a "network" may include one or more data links that enable the transport of electronic data between computer systems and/or modules. When information is transferred or provided over a network or another communications connection (either hardwired, wireless, or a combination of hardwired or wireless) to a computer, the computer uses that connection as a computer-readable medium. Thus, by way of example, and not limitation, computer-readable media can also comprise a network or data links which can be used to carry or store desired program code means in the form of computer-executable instructions or data structures and which can be accessed by a general purpose or special purpose computer.

Computer-executable instructions comprise, for example, instructions and data which cause or otherwise configure a general purpose computer, special purpose computer, or special purpose processing device to perform a certain function or group of functions. The computer executable instructions may be, for example, binaries, intermediate format instructions such as assembly language, or source code. Although some subject matter may have been described in language specific to examples of structural features and/or method steps, it is to be understood that the subject matter defined in the appended claims is not necessarily limited to these described features or acts. Rather, the described features and steps are disclosed as examples of components of systems and methods within the scope of the appended claims.

We claim:

1. A graphics processor, comprising:
    a processor programmable by instructions from an instruction set, the instruction set comprising a special purpose intersection test instruction that provides for a reference to a geometry shape, the geometry shape either being an element of geometry acceleration data or a primitive, and a reference to one or more rays to test for intersection with the geometry shape;
    one or more test cells interfaced to receive an instance of the special purpose intersection test instruction, the instance of the special purpose intersection test instruction specifying a geometry shape and referencing one or more rays to be tested for intersection with that specified geometry shape, wherein the one or more test cells are configurable to perform an intersection test between the specified geometry shape and the one or more rays;
    a decode unit configured to receive the instance of the special purpose intersection test instruction, and use the special purpose intersection test instruction to cause the one or more test cells to be configured to test the specified geometry shape with the one or more referenced rays for intersection and output a result; and
    a fetch unit coupled with the decode unit, and wherein the decode unit is configured to cause the fetch unit to retrieve definition data for the geometry shape from a memory for use by the one or more test cells.

2. The graphics processor of claim 1, further comprising a data cache coupled with the one or more test cells, wherein the decode unit is further configured to address the data cache based on the special purpose instruction to provide ray data, referenced by the special purpose intersection test instruction, for use by the one or more test cells.

3. The graphics processor of claim 2, wherein the decode unit is configured to decode a ray reference from the special purpose instruction and use that ray reference to address the data cache.

4. The graphics processor of claim 1, further comprising a write back unit coupled to the processor and configured to output indications of ray intersection with geometry acceleration elements to the processor.

5. The graphics processor of claim 1, wherein the instruction set provides for one or more bits set to differentiate the special purpose intersection test instruction from other instructions in the instruction set.

6. The graphics processor of claim 1, wherein the special purpose instruction is a single instruction multiple data instruction that accepts a plurality of references to rays to be tested for intersection with the geometry shape.

7. The graphics processor of claim 1, wherein the instruction set comprises a plurality of special purpose intersection test instructions, each for causing the one or more test cells to perform a particular intersection testing algorithm.

8. The graphics processor of claim 1, wherein the instruction set comprises a plurality of special purpose intersection test instructions, each for causing the one or more test cells to be configured to test a respective kind of geometric shape for intersection.

9. The graphics processing system of claim 1, wherein the one or more test cells are configured to perform intersection tests at a resolution of a predetermined number of bits.

10. The graphics processor of claim 1, further comprising a cache for storing instances of the special purpose intersection test instruction, the cache coupled with the decode unit.

11. A method of graphics processing using ray tracing, comprising:
   producing, by a processor, an instance of a special purpose intersection test instruction, within an instruction set, the processor configurable by instructions from the instruction set, the instance specifying a particular geometry shape and referencing one or more rays to be tested for intersection with that specified geometry shape;
   outputting the instance of the special purpose intersection test instruction to a test cell;
   configuring the test cell to perform an intersection test between the shape and the one or more rays specified by the instance of the special purpose intersection test instruction and to output a result of the intersection test; and
   within a fetch unit, initiating fetching of data for the geometry shape specified by the instance of the special purpose instruction.

12. The method of graphics processing using ray tracing of claim 11, further comprising using the outputted result to define a subsequent instance of the special purpose intersection test instruction.

13. The method of graphics processing using ray tracing of claim 11, further comprising collectively a plurality of references to rays that are to be tested for intersection with a particular shape and forming the instance of the special purpose intersection test instruction to test the collected plurality of rays for intersection with the particular shape.

14. The method of graphics processing using ray tracing of claim 11, further comprising addressing a data cache based on the references to the one or more rays in the instance of the special purpose intersection test instruction.

15. The method of graphics processing using ray tracing of claim 11, further comprising obtaining data from the instance of the special purpose intersection test instruction that specifies a type of test to be performed.

16. The method of graphics processing using ray tracing of claim 15, wherein the type of test is selected from a test for a primitive defining geometry located in a 3-D scene and an element from an acceleration structure.

17. The method of graphics processing using ray tracing of claim 11, further comprising generating additional instances of the special purpose intersection test instruction based on the outputted result.

18. The method of graphics processing using ray tracing of claim 11, further comprising initiating fetching of data defining geometry shapes for a plurality of instances of the special purpose instruction.

19. A system for graphics processing, comprising:
   a non-transitory memory having stored therein data defining an instance of a special purpose intersection test instruction, the instance identifying a geometry shape and one or more rays to be tested for intersection with the identified geometry shape;
   a test cell coupled with the non-transitory memory and containing logic configurable according to the instance of the special purpose intersection test instruction to perform the intersection test;
   a fetch unit coupled with a memory and configurable to retrieve data defining the geometry shape identified by the instance of the special purpose instruction, for use by the test cell in performing the intersection test; and
   a memory having a port coupled with the test cell and storing data defining rays currently being tested for intersection, and data defining the one or more rays referenced by the instance of the special purpose intersection test instruction is retrieved from the memory and provided to the test cell.

* * * * *